US008974337B2

(12) United States Patent
Kawasaki et al.

(10) Patent No.: US 8,974,337 B2
(45) Date of Patent: Mar. 10, 2015

(54) VEHICLE POWER TRANSMISSION DEVICE AND CONTROL SYSTEM FOR POWER TRANSMISSION

(75) Inventors: Koji Kawasaki, Anjo (JP); Takenori Matsue, Anjo (JP)

(73) Assignees: Denso Corporation, Kariya (JP); Nippon Soken, Inc., Nishio (JP)

(*) Notice: Subject to any disclaimer, the term of this patent is extended or adjusted under 35 U.S.C. 154(b) by 955 days.

(21) Appl. No.: 12/947,138

(22) Filed: Nov. 16, 2010

(65) Prior Publication Data

US 2011/0118077 A1 May 19, 2011

(30) Foreign Application Priority Data

Nov. 16, 2009 (JP) ................................ 2009-261385

(51) Int. Cl.
*F16H 3/72* (2006.01)
*B60K 6/445* (2007.10)
*B60W 10/02* (2006.01)
*B60W 10/06* (2006.01)
*B60W 10/08* (2006.01)
*B60W 10/107* (2012.01)
*B60W 20/00* (2006.01)
(Continued)

(52) U.S. Cl.
CPC ............... *B60K 6/445* (2013.01); *B60W 10/02* (2013.01); *B60W 10/06* (2013.01); *B60W 10/08* (2013.01); *B60W 10/107* (2013.01); *B60W 20/102* (2013.01); *B60W 30/1882* (2013.01); *F16H 2037/0873* (2013.01); *Y02T 10/6239* (2013.01); *Y02T 10/6286* (2013.01)
USPC ............................................................ 475/5

(58) Field of Classification Search
None
See application file for complete search history.

(56) References Cited

U.S. PATENT DOCUMENTS

| 5,643,131 A | 7/1997 | Kuhn et al. |
| 5,722,502 A | 3/1998 | Kubo |
| 5,766,105 A | 6/1998 | Fellows et al. |

(Continued)

FOREIGN PATENT DOCUMENTS

| CN | 101004204 A | 7/2007 |
| CN | 101004211 | 7/2007 |

(Continued)

OTHER PUBLICATIONS

Office Action (11 pgs.) issued Feb. 22, 2013 in corresponding Chinese Application No. 201010551295.3 with English-language translation (13 pgs.).

(Continued)

*Primary Examiner* — Erin D Bishop
(74) *Attorney, Agent, or Firm* — Nixon & Vanderhye P.C.

(57) ABSTRACT

A power transmission apparatus for a vehicle which includes a first, a second, and a third rotor which split power among a motor-generator, an internal combustion engine, and a driven wheel of the vehicle. The apparatus also includes a torque transmission control mechanism which selectively transmits torque between the first rotor and the engine. When the torque transmission control mechanism establishes the transmission of torque between the first rotor and the engine, powers, as produced by the second and third rotors, are opposite in sign to each other. This enables the speed of the first rotor to be set to zero (0) or a very low speed. Therefore, when an initial torque is applied to the engine through the first rotor to start the engine, the mechanical vibration which usually arises from the application of initial torque and is to be exerted on the power transmission apparatus is minimized.

10 Claims, 18 Drawing Sheets

(51) Int. Cl.
*B60W 30/188* (2012.01)
*F16H 37/08* (2006.01)

(56) References Cited

U.S. PATENT DOCUMENTS

| | | | |
|---|---|---|---|
| 6,447,422 | B1 | 9/2002 | Haka |
| 6,732,526 | B2 | 5/2004 | Minagawa et al. |
| 6,887,175 | B2 | 5/2005 | Yamauchi et al. |
| 7,172,524 | B2 | 2/2007 | Moeller |
| 7,252,611 | B2 | 8/2007 | Raghavan et al. |
| 7,347,800 | B2 | 3/2008 | Jackson |
| 7,422,535 | B2 | 9/2008 | Raghavan et al. |
| 7,473,199 | B2 | 1/2009 | Bucknor et al. |
| 7,572,201 | B2 | 8/2009 | Supina et al. |
| 7,637,836 | B2 | 12/2009 | Watanabe et al. |
| 7,717,817 | B2 | 5/2010 | Raghavan et al. |
| 8,337,352 | B2 | 12/2012 | Morrow et al. |
| 2004/0065520 | A1 | 4/2004 | Murray |
| 2006/0276295 | A1 | 12/2006 | Gitt |
| 2008/0236917 | A1* | 10/2008 | Abe et al. ............ 180/65.4 |
| 2009/0157269 | A1 | 6/2009 | Matsubara et al. |
| 2010/0063704 | A1 | 3/2010 | Okubo et al. |
| 2010/0120579 | A1 | 5/2010 | Kawasaki |
| 2010/0273605 | A1 | 10/2010 | Kawasaki et al. |
| 2011/0028260 | A1 | 2/2011 | Kawasaki et al. |
| 2011/0118075 | A1 | 5/2011 | Kawasaki et al. |
| 2011/0118077 | A1 | 5/2011 | Kawasaki et al. |
| 2012/0028749 | A1 | 2/2012 | Kawasaki et al. |
| 2012/0309584 | A1 | 12/2012 | Matsue et al. |

FOREIGN PATENT DOCUMENTS

| | | |
|---|---|---|
| CN | 101020411 | 8/2007 |
| JP | 9-46821 | 2/1997 |
| JP | 9-506417 | 6/1997 |
| JP | 2000-142146 | 5/2000 |
| JP | 2001-108073 | 4/2001 |
| JP | 2002-281607 | 9/2002 |
| JP | 2004-514103 | 5/2004 |
| JP | 2-3580257 | 10/2004 |
| JP | 2-3614409 | 1/2005 |
| JP | 2005-48940 A | 2/2005 |
| JP | 2-3626151 | 3/2005 |
| JP | 2006-77859 | 3/2006 |
| JP | 2006-308039 | 11/2006 |
| JP | 2008-247192 | 10/2008 |
| JP | 2009-190455 A | 8/2009 |

OTHER PUBLICATIONS

Japanese Office Action dated Dec. 13, 2011, issued in corresponding Japanese Patent Application No. 2009-261386 with English Translation.

Notification of Reasons for Rejection dated Dec. 10, 2012 for Japanese Patent Application No. 2009-179547 with English Translation.

Japanese Office Action dated Oct. 16, 2012, issued in corresponding Japanese Patent Application No. 2009-242314 with English Translation.

U.S. Appl. No. 12/947,142, filed Nov. 16, 2011.

U.S. Appl. No. 12/591,155, filed Nov. 10, 2009.

Office Action (8 pages) dated Feb. 4, 2013, issued in corresponding Chinese Application No. 201010551303.4 and English translation (7 pages).

Japanese Office Action dated Oct. 18, 2011, issued in counterpart Japanese Application No. 2009-261385 with English Translation.

U.S. Appl. No. 12/848,574, filed Aug. 2, 2010.

* cited by examiner

FIG. 2(a)
MG START IN 1ST OPERATION MODE
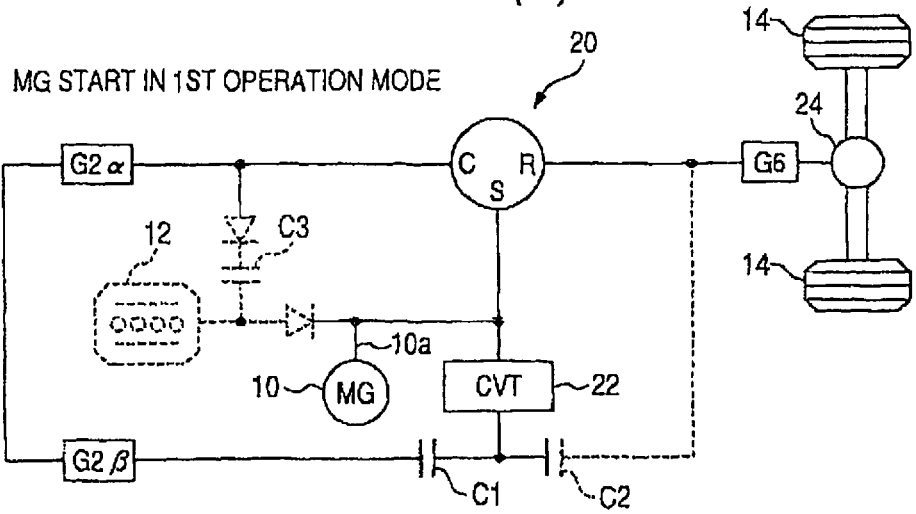
FIG. 2(b)
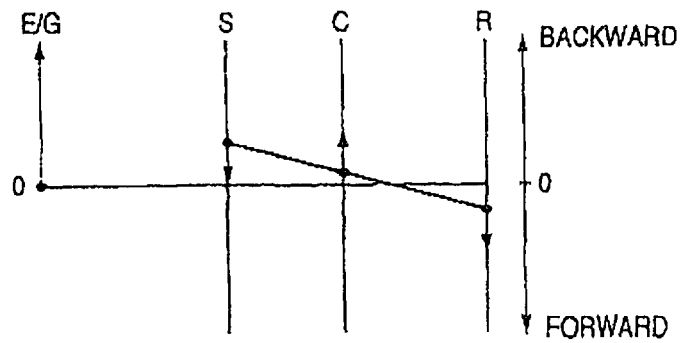
FIG. 2(c)
|  | ROTATIONAL DIRECTION | | | TORQUE | | | POWER | | |
|---|---|---|---|---|---|---|---|---|---|
|  | S | C | R | S | C | R | S | C | R |
| FORWARD | + | + | − | − | + | − | − | + | + |
| BACKWARD | + | + | + | + | − | + | + | − | + |

EV TRAVEL IN 2ND OPERATION MODE

FIG. 4(a)
ENGINE START IN 2ND OPERATION MODE
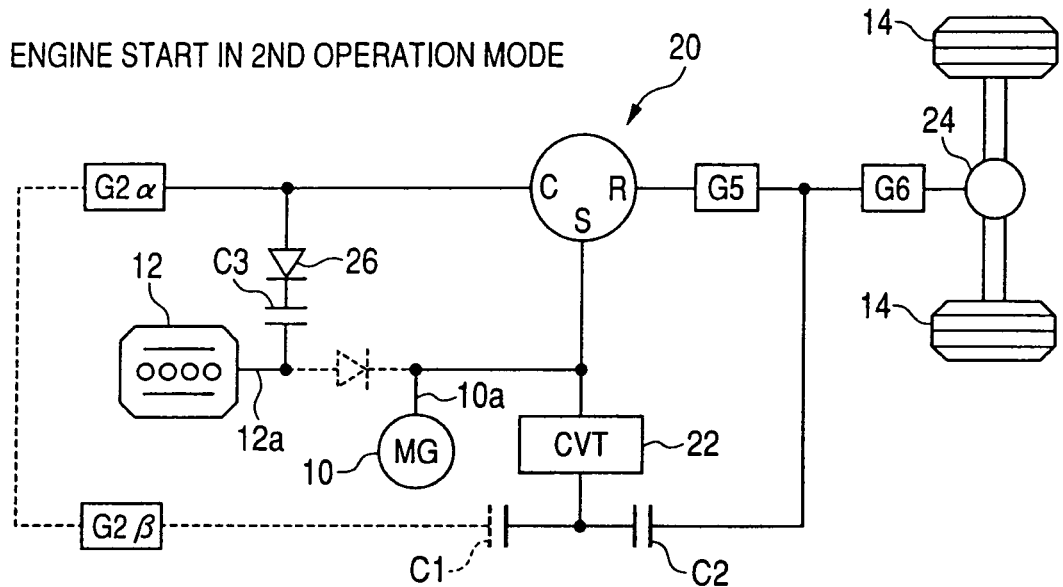
FIG. 4(b)
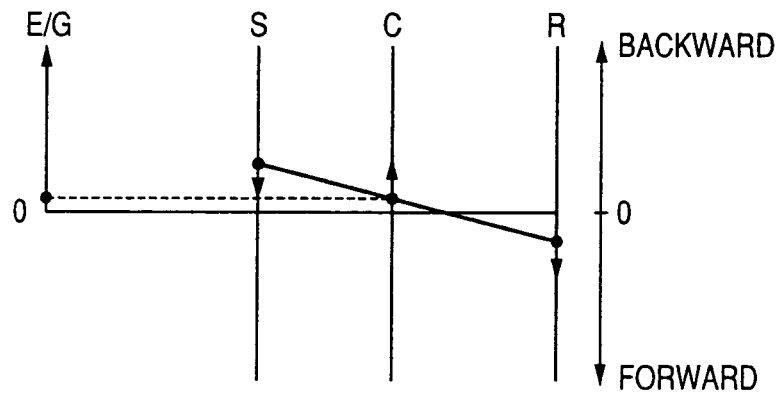
FIG. 4(c)
| ROTATIONAL DIRECTION | | | TORQUE | | | POWER | | |
|---|---|---|---|---|---|---|---|---|
| S | C | R | S | C | R | S | C | R |
| − | − | + | + | − | + | − | + | + |

ENGINE TRAVEL IN 2ND OPERATION MODE

ENGINE START IN 1ST OPERATION MODE n=1, 2, 4~6   wGna, wGnb : speed       rn = (wGnb)/(wGna)
              wR, wS·wC : speed        ρ = (Teeths S)/(Teeths R)
              ρwS−(1+ρ)wC+wR = 0

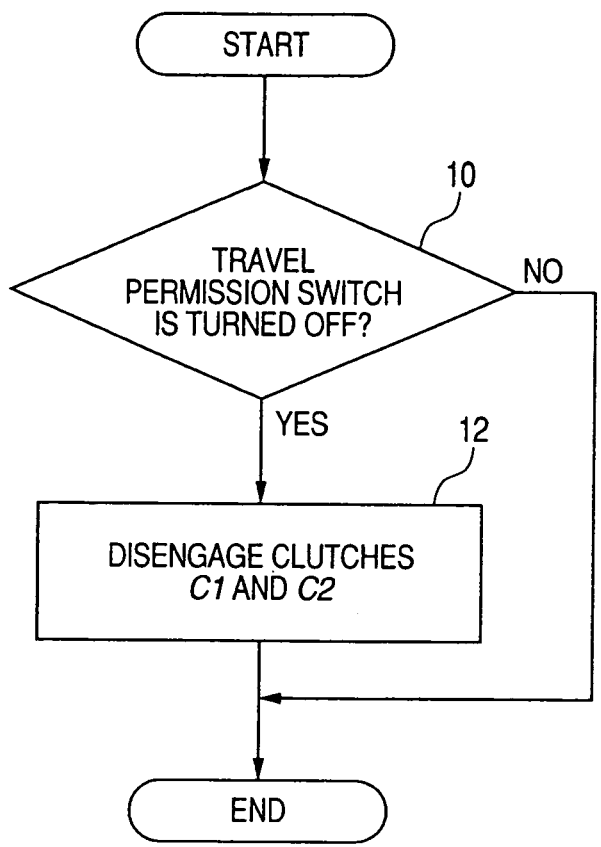

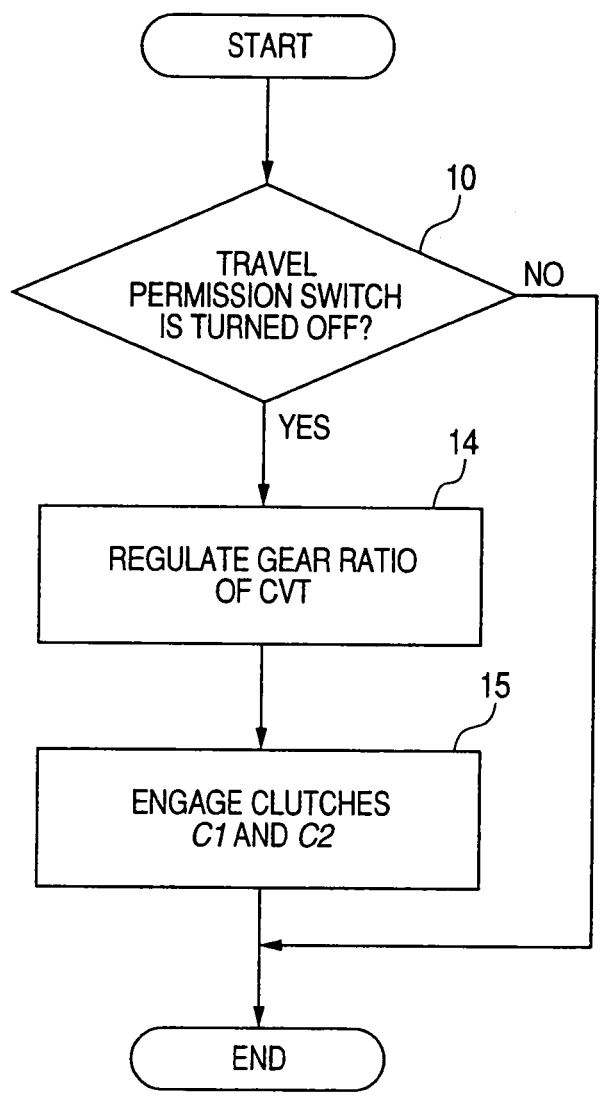

VEHICLE POWER TRANSMISSION DEVICE AND CONTROL SYSTEM FOR POWER TRANSMISSION

CROSS REFERENCE TO RELATED DOCUMENT

The present application claims the benefits of Japanese Patent Application No. 2009-261385 filed on Nov. 16, 2009, the disclosure of which is incorporated herein by reference.

BACKGROUND OF THE INVENTION

1. Technical Field of the Invention

The present invention relates generally to a vehicle power transmission device equipped with a plurality of power split rotors which work to split output power or torque among an electric rotating machine (e.g., a dynamo-electric machine), an internal combustion engine, and driven wheels of a vehicle and are designed to rotate in conjunction with each other and a power transmission control system for such a power transmission device.

2. Background Art

In recent years, in terms of reducing the amount of energy consumed by automotive vehicles, so-called hybrid vehicles have been put into practical use which are equipped with an electric rotating machine such as an in-vehicle power source functioning as both an electric motor and a generator in addition to an internal combustion engine. The hybrid vehicles are typically controlled to stop the internal combustion engine in a low speed running range in view of the fact that the internal combustion engine is usually inefficient in energy use at low speeds. However, the hybrid vehicles face difficulties in starting the internal combustion engine during running of the vehicles. For example, it is difficult to bring a rotor which is coupled with driven wheels of the vehicle and rotating at a relatively high speed into mechanical connection with the crankshaft of the internal combustion engine which is stopped.

In order to avoid the above problem, there have been in practical use hybrid vehicles equipped with an electric motor whose output shaft is connected directly to a crankshaft of the internal combustion engine to transmit the torque, as outputted from the electric motor, to the crankshaft to start the engine. After start-up of the engine, the torque, as produced by the engine, is transmitted to the driven wheels of the vehicle.

Additionally, there have been in practical use hybrid vehicles equipped with a typical planetary gear speed reducer (also called an epicycle reduction gear train) made up of three power split rotors: a sun gear, a carrier (also called a planetary carrier), and a ring gear which work to split power or torque among the electric rotating machine, the internal combustion engine, and the driven wheels of the vehicle. The driven wheels and the electric rotating machine are coupled mechanically to the ring gear. The generator is coupled mechanically to the sun gear. The internal combustion engine is coupled mechanically to the carrier. In operation, when torque is applied to the sun gear or the ring gear, the carrier is rotated, thereby rotating the rotating shaft (i.e., the crankshaft) of the internal combustion engine. The internal combustion engine is started by the output torque of the carrier. After the start-up of the internal combustion engine, the engine torque is transmitted to the driven wheels of the vehicle through the carrier.

For example, Published Japanese translation of International Patent Application No. 2004-514103 teaches the above type of power split rotors which split power between a main engine installed in the vehicle and driven wheels of the vehicle.

The direct coupling of the rotating shaft of the electric motor to that of the internal combustion engine, as described above, will cause the torque load to be exerted by the internal combustion engine on the electric motor when the internal combustion engine is not fired, but being free-wheeling or when the engine is being cranked by the electric motor, thus resulting in an increase in energy consumption in the vehicle. A problem is also encountered in that the pulsation of torque occurring at the rotating shaft of the internal combustion engine when started may result in a decrease in driveability of the vehicle.

Further, the use of the planetary gear speed reducer leads to the problem that starting of the internal combustion engine when the rotational speed of the carrier is low will cause the internal combustion engine to be kept run at a low speed for a while. This is against the intended purpose of the hybrid vehicles which is to run the internal combustion engine in a speed range in which the engine efficiency is high.

SUMMARY OF THE INVENTION

It is, therefore, a principal object of the invention to avoid the disadvantages of the prior art.

It is another object of the invention to provide a power transmission apparatus for a vehicle which is equipped with power split rotors to split power or torque among an electric rotating machine, an internal combustion engine, and a driven wheel of the vehicle and designed to ensure the startability of the internal combustion engine.

According to one aspect of the invention, there is provided a power transmission apparatus for a vehicle equipped with an electric rotating machine, an internal combustion engine, and at least one driven wheel. The power transmission apparatus comprises: (a) a power split device which includes a first, a second, and a third rotor which are rotate in conjunction with each other to split power among an electric rotating machine, an internal combustion engine, and a driven wheel of the vehicle, the first, the second, and the third rotor being so linked as to have rotational speeds thereof arrayed on a straight line in a nomographic chart; (b) a torque transmission control mechanism which selectively establishes and blocks transmission of torque between the first rotor and the internal combustion engine; (c) a connecting mechanism which establishes a mechanical connection between the second rotor and the third rotor; and (d) a speed variator which has a variable input-to-output speed ratio. When the torque transmission control mechanism establishes the transmission of torque between the first rotor and the internal combustion engine, powers of the second and third rotors, are opposite in sign to each other.

In other words, the power split device is so designed that the powers of the second and third rotors are opposite in sign to each other when the torque is transmitted from the first rotor to the internal combustion engine through the torque transmission control mechanism. The power is, therefore, circulated between the second and third rotors, thus enabling the speed of the first rotor to be set to zero (0) or a very low speed or the power of the first rotor to be decreased to a very low level easily. Therefore, for example, when the engine is at rest, and it is required to apply initial torque to the internal combustion engine through the first rotor to start the internal combustion engine, a rate at which the torque to be applied to the engine is increased may be changed slowly, thus minimizing mechanical vibrations which occur when the engine is being cranked and are to be transmitted to the power transmission apparatus, the driven wheels, and the operator of the vehicle. After completion of the application of initial torque to the internal combustion engine through the first rotor, the torque, as produced by the internal combustion engine, may be outputted to the power split device (i.e., the first rotor or other rotors).

The power will be circulated between the second and third rotors at a time when they are connected mechanically by the connecting mechanism. The above setting of the signs is, therefore, achieved easily without having to two electric rotating machines: one having an input to which power is inputted from one of the second and third rotors, and the second outputting rotational energy to the other of the second and third rotors.

The inclination of the straight line in the nomographic chart may be regulated by changing the input-to-output speed ratio of the speed variator. In other words, the speed of the first rotor may be controlled by changing the input-to-output speed ratio of the speed variator regardless of the speed of the driven wheel. It is, therefore, possible to control the speed of the first rotor when it is required to transmit torque from the first rotor to the internal combustion engine through the torque transmission, control mechanism.

In the preferred mode of the invention, the electric rotating machine and the driven wheel are coupled mechanically to the second and third rotors which are to be connected together by the connecting mechanism.

Torques, as produced by the first rotor, the second rotor, and the third rotor, are proportional to each other. In other words, the power split device is so designed as to exhibit such a torque relation.

The electric rotating machine is connected mechanically to the second rotor without through the speed variator. The driven wheel is coupled mechanically to the third rotor without through the speed variator. When it is required to transmit an output of the electric rotating machine to the driven wheel without the power split device, the speed of the output of the electric rotating machine may changed by the speed variator.

The power transmission apparatus may further comprise a torque applying mechanism which establishes a mechanical connection between the second rotor and the internal combustion engine to apply torque, as produced by the internal combustion engine, to the second rotor. Specifically, the first rotor serves as an engine starting rotor to be coupled to the internal combustion engine when starting the engine. The second rotor serves as a power transmitted rotor which is to be coupled to the internal combustion engine and to which torque is transmitted from the internal combustion engine. The engine starting rotor is different from the power transmitted rotor, thus enabling the speed of the internal combustion engine to be brought to an effective speed range quickly.

The torque applying mechanism is adapted to connect the internal combustion engine to the second rotor without through the speed variator.

The torque applying mechanism serves as a one-way torque transmission mechanism which has an input leading to the internal combustion engine and an output leading to the second rotor and works to transmit the torque from the input to the output when speed of the input is higher than that of the output.

A smooth mechanical connection of the internal combustion engine to the second rotor to transmit torque to the second rotor after the internal combustion engine is started up may be achieved by bringing speeds of the internal combustion engine and the second rotor into agreement with each other and then joining them together. This, however, requires fine speed control. In contrast, the one-way torque transmission mechanism starts to transmit the torque from the internal combustion engine to the second rotor when the speed of the input of the one-way torque transmission mechanism reaches that of the output. In other words, the pulsation of torque occurring when the engine is being started is not transmitted to the power transmission apparatus until the speed of the engine reaches that of the second rotor, thus avoiding the transmission of mechanical vibration from the engine to the power transmission apparatus, the driven wheel, or the operator of the vehicle.

The power transmission apparatus may further comprise a second connecting mechanism which establishes a mechanical connection between the first and second rotors through a second power transmission path, and a second variator with a variable input-to-output speed ratio disposed in the second power transmission path. A first connecting mechanism that is the connecting mechanism to connect the second and third rotors mechanically through a first power transmission path in which a first speed variator that is the speed variator is disposed and the second connecting mechanism are controlled in operation to switch between a first operation mode and a second operation mode. The first operation mode is to establish the mechanical connection between the second and third rotors through the first connecting mechanism and block the mechanical connection between the first and second rotors through the second connecting mechanism. The second operation mode is to block the mechanical connection between the second and third rotors through the first connecting mechanism and establish the mechanical connection between the first and second rotors through the second connecting mechanism.

When a sign of speed of the electric rotating machine is set to be one of plus and minus, signs of powers, as produced by the first and second rotors, are opposite to each other in the first operation mode, and signs of powers, as produced by the second and third rotors, are identical with each other in the second operation mode. In the first operation mode, the power is circulated between the first and second rotors since the signs of the powers of the first and second rotors are opposite to each other. The circulation of power may establish the geared neutral which places the speed of the third rotor at zero (0) even when absolute values of speeds of the first and second rotors are greater than zero (0), but has the disadvantage that the efficiency in using the energy. Therefore, it is not desirable to place the power transmission apparatus in the first operation mode when the disadvantage becomes great. In the second operation mode, the power is not circulated between the second and third rotors. The power transmission apparatus switches from the first operation mode in which the power is circulated to the second operation mode in which the power is not circulated under condition that the signs of the speeds of the first and second rotors are fixed. In other words, the power transmission apparatus may switch the operation thereof from the condition in which the power is circulated to the condition in which the power is not circulated without reversing the speed of the electric rotating machine.

The sign of power, as referred to herein, indicates whether the power is inputted to or outputted from each of the first to third rotors.

The first and second speed variators maybe implemented by a single speed variator such as a CVT.

A power transmission path is provided between one of the internal combustion engine and the electric rotating machine and the driven wheel. A first order derivative value of a function, in which the input-to-output speed ratio of the speed variator is expressed by an independent variable, and a total input-to-output speed ratio of the power transmission path is expressed by a dependent variable, with respect to the independent variable in the first operation mode is opposite in sign to that in the second operation mode. This enables the total input-to-output speed ratio to be changed to have values different between the first and second operation modes by changing a direction in which the input-to-output speed ratio of the speed variator is changed in the second operation mode to be opposite a direction in which the input-to-output speed ratio of the speed variator is changed in the first operation mode when the first operation mode is switched to the second operation mode. This results in an increased range in which the total input-to-output speed ratio is permitted to be changed, thus allowing the power transmission apparatus to be reduced in size.

The power transmission apparatus may also include a first-to-second mode switching speed variator which works to change the speed of at least one of the second and third rotors for compensating for a difference in speed between the second and third rotors when the first operation mode is switched to the second operation mode to establish the mechanical connection between the second and third rotors. Specifically, an input speed of the second connecting mechanism may be identical with an output speed of the second connecting mechanism. This eliminates the omission of transmission of torque through the second connecting mechanism.

The first-to-second mode switching speed variator may have a fixed input-to-output speed ratio.

The power transmission apparatus may further include a second-to-first mode switching speed variator which works to change speed of at least one of the first and second rotors for compensating for a difference in speed between the first and second rotors when the second operation mode is switched to the first operation mode to establish the mechanical connection between the first and second rotors. Specifically, an input speed of the first connecting mechanism may be identical with an output speed of the first connecting mechanism. This eliminates the omission of transmission of torque through the first connecting mechanism.

The second-to-first mode switching speed variator may have a fixed input-to-output speed ratio.

The torque transmission control mechanism may include an electronically-controlled breaker which blocks the transmission of torque between the first rotor and the internal combustion engine. This may avoid the transmission of torque from the first rotor to the internal combustion engine before the internal combustion engine is started.

The torque transmission control mechanism may also include a one-way power transmission mechanism which establishes the transmission of torque between the first rotor and the internal combustion engine under condition that speed of an input of the one-way power transmission mechanism leading to the first rotor is higher than that of an output of the one-way power transmission mechanism leading to the internal combustion engine, thereby avoiding the transmission of torque from the internal combustion engine to the first rotor when the torque is produced upon start of combustion of fuel in a combustion chamber of the internal combustion engine. Usually, when the torque is produced by the combustion of fuel in the internal combustion engine, the speed of a rotating shaft (i.e., and output shaft) of the internal combustion engine rises quickly. The quick rise in speed of the rotating shaft will occur in a short time. It is, therefore, very difficult or impossible to disconnect between the internal combustion engine and the first rotor after the start of combustion of fuel is detected. When the quick rise in speed is transmitted to the first rotor, it will result in pulsation of torque in the power transmission device. In order to avoid this problem, the one-way power transmission mechanism works not to transmit the torque from the internal combustion engine to the first rotor when the speed of the internal combustion engine rises, so that the speed of the output of the one-way power transmission mechanism is higher than that of the input of the one-way power transmission mechanism, thereby eliminating the transmission of torque pulsation to an operator of the vehicle.

The power split device may be implemented by a single planetary gear set. Specifically, each of the first, second, and third rotors may be one of a sun gear, a carrier, and a ring gear.

According to the second aspect of the invention, there is provided a power transmission control system for a vehicle which comprises a power transmission device and a controller. The power transmission device includes (a) a power split device which includes a first, a second, and a third rotor which are rotate in conjunction with each other to split power among an electric rotating machine, an internal combustion engine, and a driven wheel of a vehicle, the first, the second, and the third rotor being so linked as to have rotational speeds thereof arrayed on a straight line in a nomographic chart, (b) a torque transmission control mechanism which selectively establishes and blocks transmission of torque between the first rotor and the internal combustion engine, (c) a connecting mechanism which establishes a mechanical connection between the second rotor and the third rotor, and (d) a speed variator which has a variable input-to-output speed ratio. When the torque transmission control mechanism establishes the transmission of torque between the first rotor and the internal combustion engine, powers of the second and third rotors are opposite in sign to each other. The controller actuates the torque transmission control mechanism to transmit torque, as produced by the first rotor, to the internal combustion engine when speed of the internal combustion engine is lower than a given value.

The given value may be a typical idling speed of the internal combustion engine that is a minimum speed required to ensure the stability in operation of the internal combustion engine.

According to the third aspect of the invention, there is provided a power transmission control system for a vehicle which comprises a power transmission device and a controller. The power transmission device includes (a) a power split device which includes a first, a second, and a third rotor which are rotate in conjunction with each other to split power among an electric rotating machine, an internal combustion engine, and a driven wheel of a vehicle, the first, the second, and the third rotor being so linked as to have rotational speeds thereof arrayed on a straight line in a nomographic chart, (b) a torque transmission control mechanism which selectively establishes and blocks transmission of torque between the first rotor and the internal combustion engine, (c) a first connecting mechanism which establishes a mechanical connection between the second rotor and the third rotor, (d) a second connecting mechanism which establishes a mechanical connection between the first rotor and the second rotor, and (d) a speed variator which has a variable input-to-output speed ratio. When the torque transmission control mechanism establishes the transmission of torque between the first rotor and the internal combustion engine, powers of the second and third rotors are opposite in sign to each other. The controller which controls operations of the first and second connecting mechanism to switch between a first and a second operation mode. The first operation mode is to establish the mechanical connection between the second and third rotors through the first connecting mechanism and block the mechanical connection between the first and second rotors through the second connecting mechanism. The second operation mode is to block the mechanical connection between the second and third rotors through the first connecting mechanism and establish the mechanical connection between the first and second rotors through the second connecting mechanism. The controller also works to inhibit both the first and second connecting mechanisms from establishing the mechanical connections, respectively, when a travel permission switch for the vehicle is in an off-state.

According to the fourth aspect of the invention, there is provided a power transmission control system for a vehicle which comprise a power transmission device and a controller. The power transmission device includes (a) a power split device which includes a first, a second, and a third rotor which are rotate in conjunction with each other to split power among an electric rotating machine, an internal combustion engine, and a driven wheel of a vehicle, the first, the second, and the third rotor being so linked as to have rotational speeds thereof arrayed on a straight line in a nomographic chart, (b) a torque transmission control mechanism which selectively establishes and blocks transmission of torque between the first rotor and the internal combustion engine, (c) a first connecting mechanism which establishes a mechanical connection between the second rotor and the third rotor, (d) a second connecting mechanism which establishes a mechanical connection between the first rotor and the second rotor, and (d) a speed variator which has a variable input-to-output speed ratio. When the torque transmission control mechanism establishes the transmission of torque between the first rotor and the internal combustion engine, powers of the second and third rotors are opposite in sign to each other. The controller controls operations of the first and second connecting mechanism to switch between a first and a second operation mode. The first operation mode is to establish the mechanical connection between the second and third rotors through the first connecting mechanism and block the mechanical connection between the first and second rotors through the second connecting mechanism. The second operation mode is to block the mechanical connection between the second and third rotors through the first connecting mechanism and establish the mechanical connection between the first and second rotors through the second connecting mechanism. The controller also works to control the input-to-output speed ratio of the speed variator so that a total input-to-output speed ratio of a power transmission path extending from one of the internal combustion engine and the electric rotating machine to the driven wheel to have values different between the first and second operation modes. The controller establishes the mechanical connections through the first and second connecting mechanisms when a travel permission switch for the vehicle is turned off.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2(a) is a schematic block diagram which shows a power transmission path when a vehicle is started by a motor-generator in a first operation mode;

FIG. 2(b) is a nomographic chart which represents an operation of a power split device of the power transmission device of FIG. 1(a) along with the speed of an internal combustion engine;

FIG. 2(c) is a table which lists a relation in sign of rotational direction, torque, and power among a sun gear, a carrier, and a ring gear of the power split device of FIGS. 2(a) and 2(b);

FIG. 4(a) is a schematic block diagram which shows a power transmission path when an internal combustion engine is started by a motor-generator in a second operation mode;

FIG. 4(b) is a nomographic chart which represents an operation of a power split device along with the speed of an internal combustion engine;

FIG. 4(c) is a table which lists a relation in sign of rotational direction, torque, and power among a sun gear, a carrier, and a ring gear of the power split device of FIGS. 4(a) and 4(b);

FIG. 17 is a flow chart of a program which may be executed by a power transmission device of the first embodiment when a vehicle is stopped; and FIG. 18 is a flow chart of a modified program which may be executed by a power transmission device of the first embodiment when a vehicle is stopped.

DESCRIPTION OF THE PREFERRED EMBODIMENTS

Figure 1A:
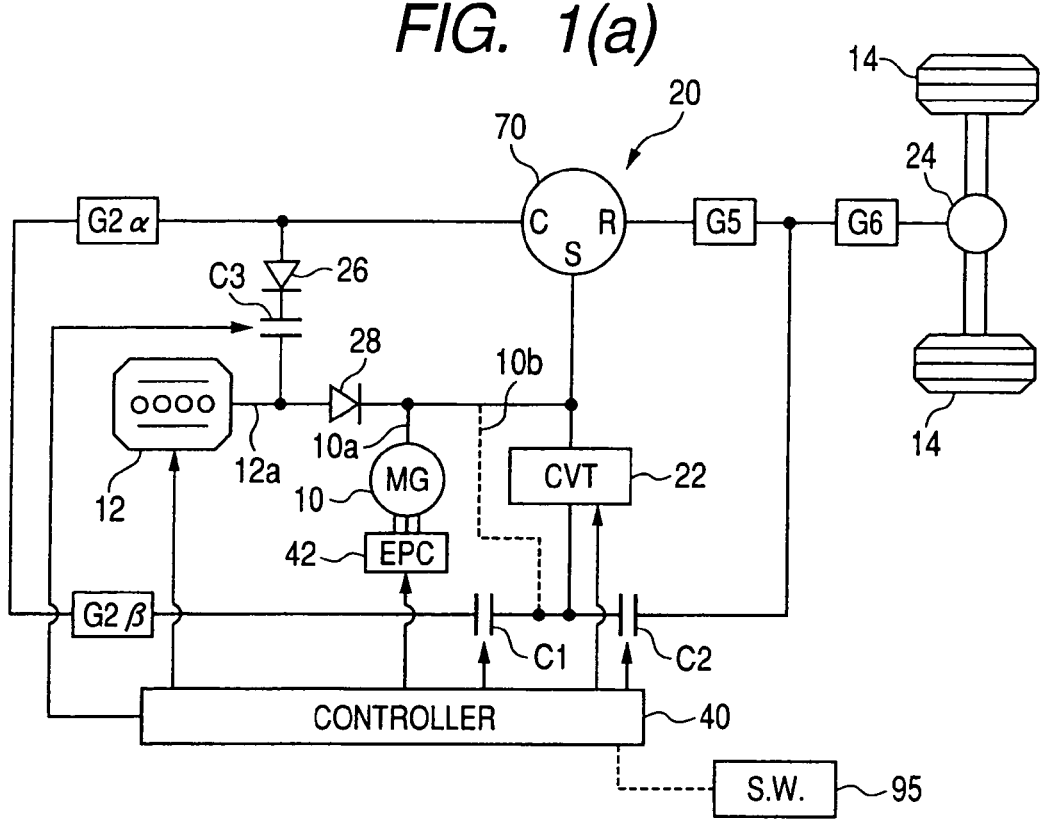
FIG. 1(a) is a block diagram which illustrates a power transmission device of the first embodiment of the invention which is installed in a hybrid system for a vehicle.
Figure 1B:
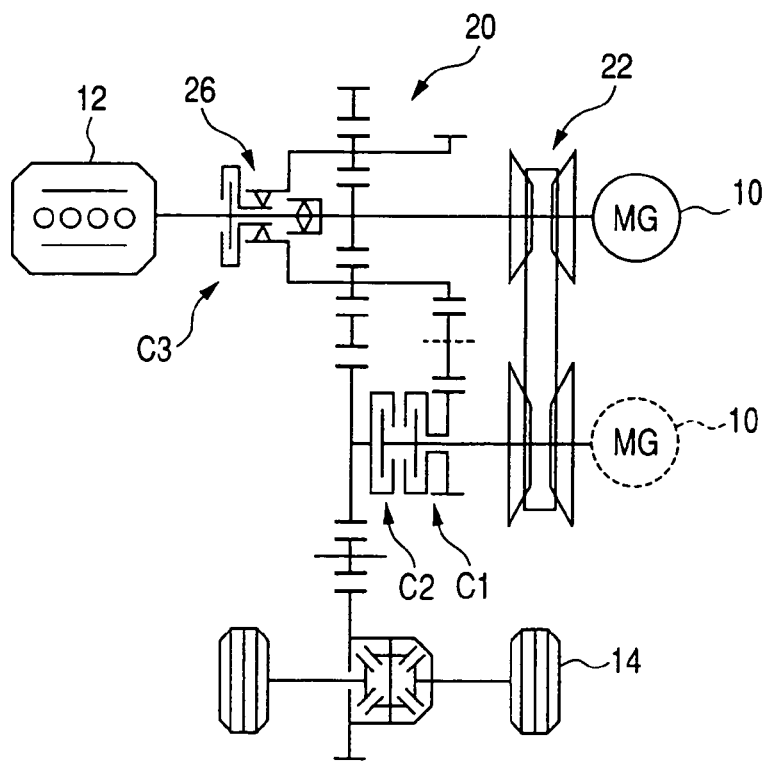
FIG. 1(b) is a view of power transmission paths of the power transmission device of FIG. 1(a)

Referring to the drawings, wherein like reference numbers refer to like parts in several views, particularly to FIGS. 1(a) and 1(b), there is shown a hybrid system equipped with a power transmission control system according to the first embodiment of the invention. The power transmission control system is equipped with a power transmission device and a controller working to control an operation of the power transmission device.

FIG. 1(a) illustrates the structure of the hybrid system. FIG. 1(b) is a skeleton view of power transmission paths.

The hybrid system includes a motor-generator 10 and a power split device 20. The motor-generator 10 is made of a three-phase ac motor-generator and works as an in-vehicle power producing device along with an internal combustion engine 12 to run an automotive vehicle. The power split device 20 works to split power or torque among the motor-generator 10, the internal combustion engine (e.g., a gasoline engine) 12, and driven wheels 14 of the vehicle.

The power split device 20 is equipped with a single planetary gear set 70 made up of three power split rotors: a sun gear S, a carrier C, and a ring gear R. To the sun gear S, an output axis (i.e. a rotating shaft) 10a of the motor-generator 10 is coupled mechanically. The ring gear R is also connected mechanically to the sun gear S through a continuously variable transmission (CVT) 22, a clutch C2, and a gear G5. The motor-generator 10 is, therefore, connected mechanically to the ring gear R through the CVT 22, the clutch C2, and the gear G5. In other words, the motor-generator 10 and the ring gear R are so connected through a mechanical interlocking path that they rotate in conjunction with each other without through the other power split rotors of the power split device 20. The CVT 36, as used in this embodiment, is of a mechanical type using a metallic or rubber belt. The gear G5 is implemented by a counter gear which works to change a ratio of rotational speed of an input to an output thereof by a fixed factor and reverse the direction of rotation of the input, other words, reverse the sign in direction of rotation of the output to that of the input. The clutch C2 works as an electronically controlled hydraulic power breaker to block transmission of power or torque between an input and an output thereof. The input and the output, as referred to therein, an input into which the energy is entered and an output from which the energy goes out, but its relation may be changed.

The motor-generator 10 may alternatively be coupled mechanically to a junction between the clutches. C1 and C2 through a power transmission path 10b, as indicated by a broken line in FIG. 1(a). This layout of the motor-generator 10 is denoted in FIG. 1(b) by "Mg" circled by a broken line.

In this case, when it is required to run the driven wheels 14 by means of the motor-generator 10, the power produced by the motor-generator 10 is, as will be described later in detail, transmitted to the driven wheels 14 only through the clutch C2 and the gear G6. This mode is suitable for a high-speed running of the vehicle. The designer may determine whether the motor-generator 10 is connected to the clutch C2 through or without the CVT 22 in terms of desired travel function of the vehicle.

To the ring gear R of the power split device 20, the driven wheels 14 are coupled mechanically. Specifically, the driven wheels 14 are joined to the ring gear R through gears G5 and G6 and a differential gear 24. The gear G6 is implemented a forward gear set (also called a normal rotation gear set) which works to change a ratio of rotational speed of an input to an output thereof by a fixed factor, but does not reverse the direction of rotation of the input.

To the carrier C of the power split device 20, the sun gear S is coupled mechanically through gears G2α and G2β, a clutch C1, and the CVT 22. The gears G2α and G2β are each implemented by a counter gear which works to change a ratio of rotational speed of an input to an output thereof by a fixed factor and reverse the direction of rotation of the input. The gears G2α and G2β may be made by a single gear assembly or gear box.

The clutch C1 works as an electronically controlled hydraulic power breaker to block transmission of power or torque between an input and an output thereof. The clutches C1 and C2 are, as can be seen from FIG. 1(b), each joined at either of the input or the output thereof to a common rotational shaft.

The crankshaft (i.e., the rotating shaft 12a) of the engine 12 is also coupled mechanically to the carrier C through a one-way bearing 26 and a clutch C3. The one-way bearing 26 works as a one-way transmission mechanism to permit the transmission of power (torque) from the carrier C to the engine 12 under the condition that the rotational speed of the carrier C is not lower than that of the rotating shaft 12a of the engine 12. In other words, the one-way bearing 26 works to have the sun gear S follow an input of the one-way bearing 26 unless the speed of an output of the one-way bearing 26 is greater than that of the input of the one-way bearing 26. The clutch C3 works as a normally-open type of electronically controlled mechanical breaker to block the transmission of power (torque) between an input and an output thereof.

The sun gear S is also coupled mechanically to the rotating shaft 12a of the engine 12 through a one-way bearing 28, Like the one-way bearing 26, the one-way bearing 28 works as a one-way transmission mechanism to permit the transmission of power (torque) from the engine 12 to the sun gear S under the condition that the speed of the rotating shaft 12a of the engine 12 is not lower than the speed of the sun gears S. In other words, the one-way bearing 28 works to have the sun gears S follow the rotation of the rotating shaft 12a of the engine 12 unless the speed of an output of the one-way bearing 28 is greater than that of an input of the one-way bearing 28. Therefore, the engine 12 is permitted to be joined mechanically to the ring gear R through the one-way bearing 28, the CVT 22, the clutch C2, and the gear G5.

Each of the gears G1α, G2β, G5, and G6 may be implemented by a gear set made up of a plurality of gears with a fixed gear ratio (i.e., an input-to-output speed ratio).

The hybrid system also includes a controller 40 to control an operation of the power transmission device. The controller 40 works to actuate the clutches C1, C2, and C3 and the CVT 22 to control the mode of power transmission and determine a controlled variable of the engine 12. The controller 40 also works to control an operation of an inverter a power converter) 42 to determine a controlled variable of the motor-generator 10.

The power transmission device is so designed as to operate selectively either in a first operation mode or a second operation mode. In the first operation mode, the clutch C1 is in an engaged state, while the clutch C2 is in a disengaged state. In the second operation mode, the clutch C1 is in the disengaged state, while the clutch C2 is in the engaged state. The operations of the power transmission device in the first and second operation modes and a sequence of running states of the vehicle when the first operation mode is switched to the second operation mode will be described below, respectively. Note that the clutches C1 and C2 and the CVT 22 are illustrated in FIG. 1(a) as being separate from each other, but either or both of the clutches C1 and C2 and the CVT 22 may be assembled into a unit functioning as a connecting mechanism.

First Operation Mode

The first operation mode is a starting mode in which a vehicle starting operation is made by the motor-generator 10. The first operation mode will be described below with reference to FIGS. 2(a) to 2(c). FIG. 2(a) illustrates a power transmission path when the vehicle is started. FIG. 2(b) is a nomographic chart which represents the operation of the power split device 20 along with the speed of the internal combustion engine 12. In FIG. 2(b), a negative direction of rotation of the ring gear R is defined as "forward" because the gear G5 is made of a counter gear. Arrows in nomographic chart indicate directions of torque.

In the example of FIGS. 2(a) and 2(b), the clutch C3 is in the disengaged state, and the internal combustion engine 12 is stopped. The speeds of the rotors of the planetary gear set 70 which constitute the power split device 20 are dependent on the speed of the motor-generator 10 and the gear ratio (also called an output-to-input speed ratio, a variable speed ratio, a pulley ratio, or a CVT ratio) of the CVT 22. Specifically, in the nomographic chart of FIG. 2(b), the speeds of the sun gears S, the carrier C, and the ring gear S lie on a diagonal straight line. In other words, the sun gear S, the carrier C, and the ring gear R are so linked as to provide output rotational energies thereof which are arrayed straight in the nomographic chart. The speed of the ring gear R that is one of the rotors of the power split device 20 other than the sun gear S and the carrier C is, therefore, set by determining the speed of the sun gear S and the carrier C.

The hybrid system of this embodiment is capable of selecting the gear ratio (i.e., a speed ratio) of the CVT 22 to achieve the so-called geared neutral which places the speed of the driven wheels 14 at zero (0) in the first operation mode during running of the motor-generator 10. Specifically, the power split device 20 is so designed that amounts of output rotational energy (i.e., power) of the sun gear S and the carrier C that are the power split rotors of the planetary gear set 70 other than the ring gear R are, as illustrated in FIG. 2(c), opposite in sign to each other, so that the power is circulated between the sun gear S and the carrier C through a looped mechanical path. Therefore, when the geared neutral is established to place the speed of the driven wheels 14 at zero (0), it will cause the power inputted to the sun gear S to be outputted from the carrier C and then inputted to the sun gear S again. In other words, when the power split device 20 is in the geared neutral, the amount of rotational energy (i.e., power) outputted to the driven wheels 14 will be zero (0). When the power is not circulated through the looped mechanical path extending through the sun gear S and the carrier C, it will cause the output energy of the motor-generator 10 to be consumed fully as thermal energy in the power split device 20 according to the energy conservation law. This will result in impractical structure of the power split device 20 which does not work to split the power, in other words, in which the rotors do not function as power split rotors of the power split device 20. When the geared neutral is established in the hybrid system of this embodiment, it will cause the power to be recirculated inevitably in the power split device 20. The looped path extending from the carrier C to the sun gear S needs not continue mechanically completely. For instance, the looped path may be a path which has a disconnected portion to be closed selectively by a clutch to enable the rotational energy to be recirculated. Note that in FIG. 2(c), the plus (+) and minus (−) signs of the rotational direction of each of the sun gear S, the carrier C, and the ring gear R represent opposite directions: a normal direction and a reverse direction thereof, the plus (+) sign of the rotational energy (i.e., power) indicates when the rotational energy is outputted from the power split device 20, and the plus (+) and minus (−) signs of the torque are so defined as to meet the condition that the product of signs of the rotational direction and the torque will be the sign of the rotational energy (i.e., power).

The structure of the power transmission device of this embodiment is designed to enable the motor-generator 10 to produce a higher degree of torque when starting the vehicle without need for increasing the size of the motor-generator 10. This is for the following reasons.

If a ratio of the number Zs of teeth of the sun gear S to the number Zr of teeth of the ring gear R (i.e., Zs/Zr) of the power split device 20 is defined as ρ, a ratio of the speed Nc of the carrier C to the speed of the motor-generator 10 (i.e., the speed Ns of the sun gear 5) (i.e., Ns/Nc) is defined as β, and torques of the ring gear R, the sun gear 5, the carrier C, and the motor-generator 10 are defined as Tr, Ts, Tc, and Tm, respectively, equations, as listed below, are met.

$$Tr = -Tc/(1+\rho) \quad (c1)$$

$$Ts = -\rho Tc/(1+\rho) \quad (c2)$$

$$\beta(Tm+Ts) = Tc \quad (c3)$$

Eliminating torques Ts and Tc from Eq. (c3) using Eqs. (c1) and (c2), we obtain $$Tr = (\beta/\rho)Tm/\{(1/\rho)-1-\beta\} \quad (c4)$$

Eq. (c4) shows that a great increase in torque Tr of the ring gear R (i.e., the output axis of the power split device 20), in other words, the torque to be transmitted to the driven wheels 14 is achieved by approximating the ratio β to (1/ρ)−1. This ensures the torque required to start the vehicle without need for increasing the size of the motor-generator 10.

Second Operation Mode

Figure 3A:
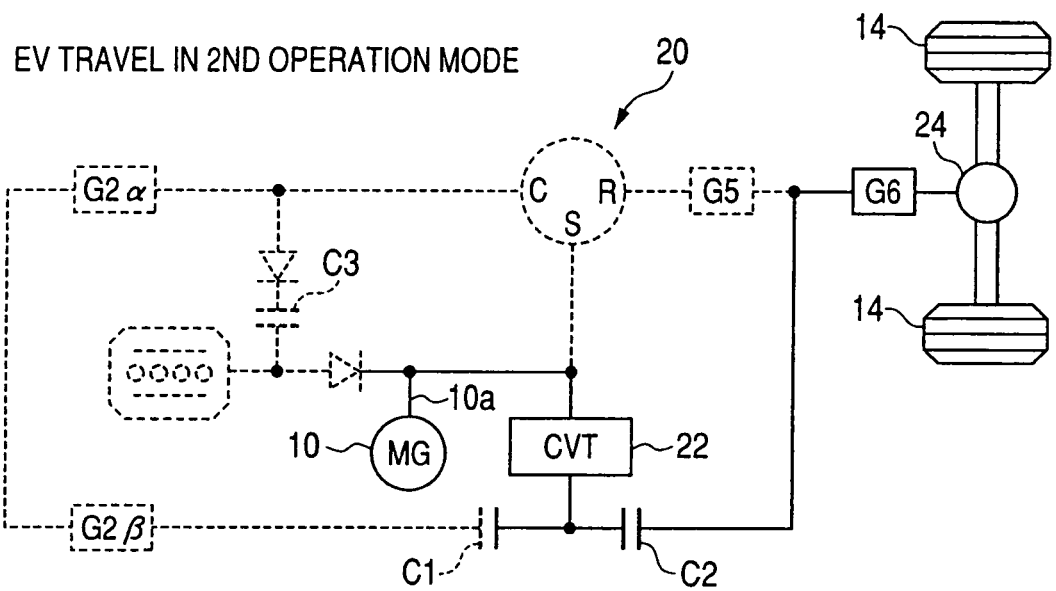
FIG. 3(a) is a schematic block diagram which shows a power transmission path when a vehicle is run by a motor-generator in a second operation mode.
Figure 3B:
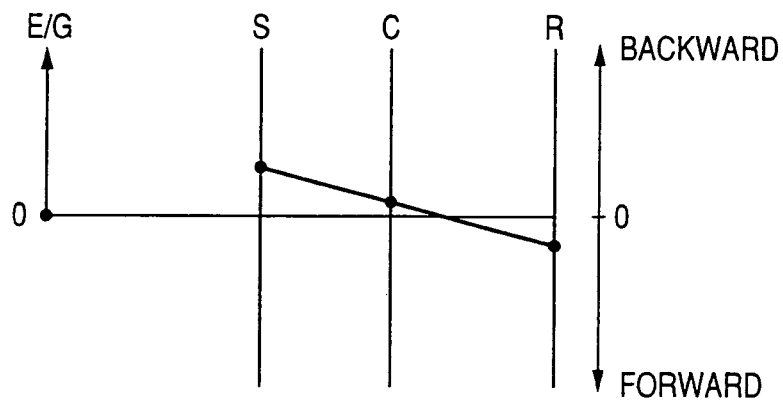
FIG. 3(b) is a nomographic chart which represents an operation of a power split device along with the speed of an internal combustion engine.

FIG. 3(a) illustrates a power transmission path of the power transmission device in the second operation mode that is an EV travel mode in which the vehicle is run only by the motor-generator 10. FIG. 3(b) is a nomographic chart in the second operation mode. The clutch C3 is in the disengaged state.

The power is transmitted from the motor-generator 10 to the driven wheels 14 through the CVT 22, the clutch C2, and the gear G6 without the power split device 20. This is because torque is not transmitted to the carrier C of the power split device 20, so that torque is also not inputted, as can be seen from Eqs. (c1) and (c2), to the sun gear S and the ring gear R.

Figure 3C:
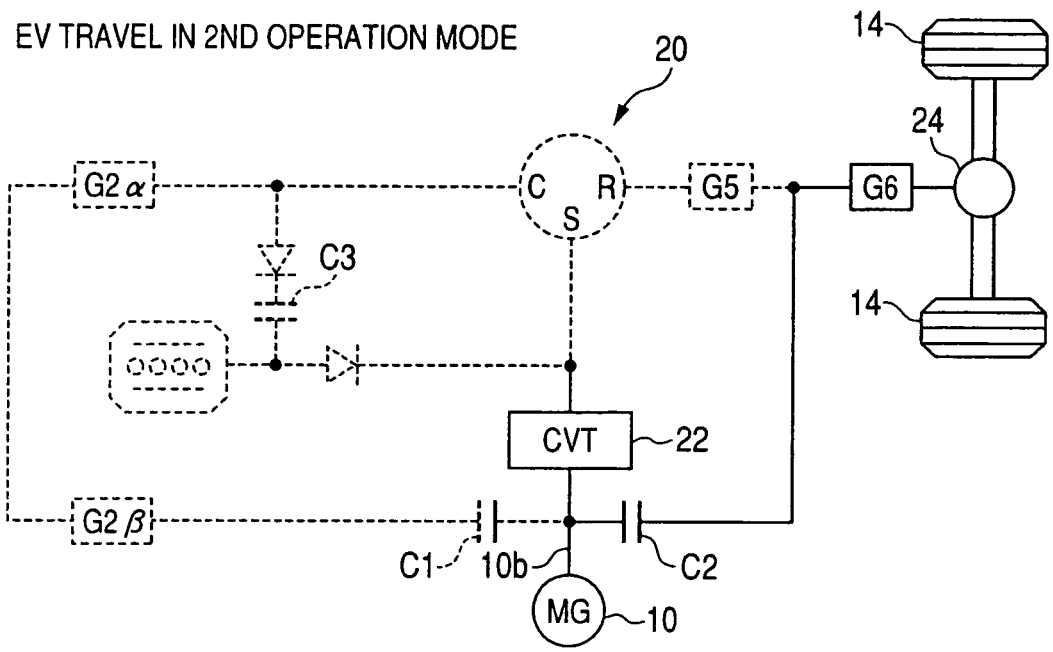
FIG. 3(c) is a schematic block diagram which shows a modification of the power transmission path of FIG. 3(a) in which a vehicle torque is transmitted to a driven wheel without a CVT in a second operation mode.

FIG. 3(c) illustrates a modification of the transmission path of FIG. 1(a). In the illustrated structure, the motor-generator 10 is connected directly to the clutch C2 instead of being coupled through the CVT 22, as illustrated in FIG. 1(a). The torque, as produced by the motor-generator 10, is transmitted to the driven wheels 14 through the clutch C2 and the gear G6.

FIG. 4(a) illustrates a power transmission path of the power transmission device when the engine 12 is started in the second operation mode. FIG. 4(b) illustrates a nomographic chart in such an engine starting mode.

The clutch C3 is engaged, as shown in FIG. 4(a), to enable the torque to be transmitted to the engine 12 through the power split device 20. Specifically, the rotational energy of a starting rotor (i.e., the carrier C) of the power split device 20 is transmitted to the rotating shaft 12a of the engine 12 through the one-way bearing 26. FIG. 4(c) demonstrates relations among the rotational direction, the torque, and the power of the sun gear S, the carrier C, and the ring gear R in the engine starting mode. The sun gear S and the ring gear R are opposite in sign of the power to each other, so that the power is circulated between the sun gear S and the ring gear R. Therefore, the carrier C may be rotated at a very low or zero (0) speed, or the absolute value of the power of the carrier C may be decreased to a small value even when the absolute value of output torque of the motor-generator 10 or the driven wheels 14 is not zero (0). This enables the speed of the input of the one-way bearing 26 relative to that of the output thereof to be lowered extremely when the clutch C3 is engaged while the rotating shaft 12a of the engine 12 is stopped, thereby minimizing mechanical vibrations of the power split device 20 which arises from the switching of the clutch C3 to the engaged state.

It is preferable that the clutch C3 is engaged when the speed of the engine 12 is lower than or equal to a minimum value required to ensure the stability in running of the engine 12. When the speed of the engine 12 is above the minimum value, the controller 40 starts to burn fuel in the internal combustion engine 12 being running and control the burning of fuel in a combustion control mode.

Figure 5A:
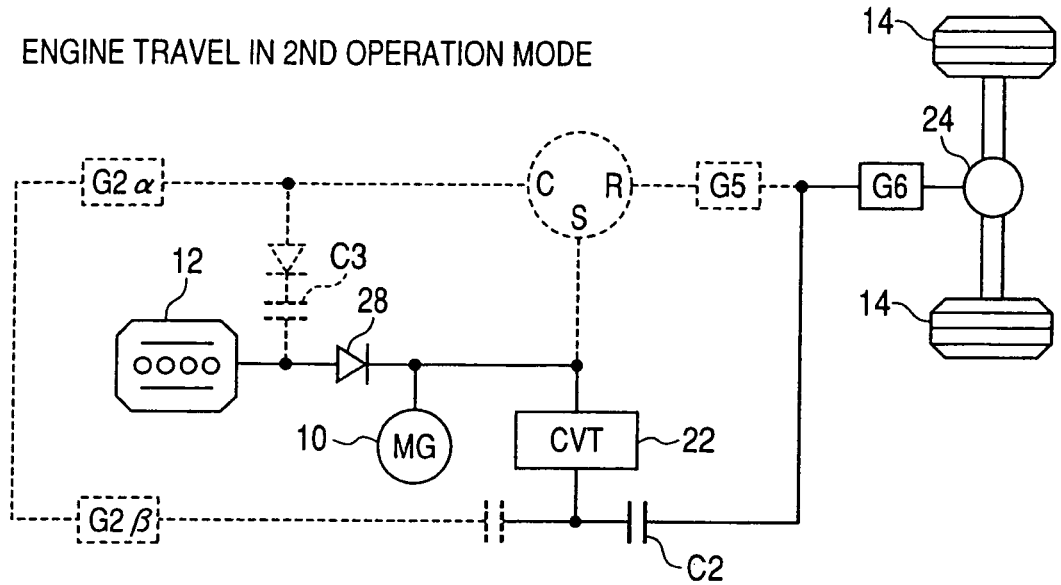
FIG. 5(a) is a schematic block diagram which shows a power transmission path when a vehicle is driven by an internal combustion engine in a second operation mode.
Figure 5B:
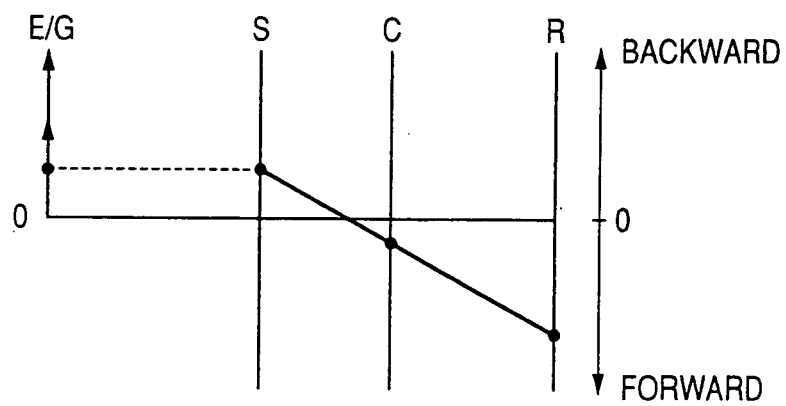
FIG. 5(b) is a nomographic chart which represents an operation of a power split device along with the speed of an internal combustion engine.

FIG. 5(a) illustrates a power transmission path of the power transmission device to run the vehicle through the engine 12 in the second operation mode. FIG. 5(b) illustrates a nomographic chart in such an engine-powered running mode.

When the speed of the engine 12 is increased, and the speed of the input of the one-way bearing 28 reaches that of the output thereof, it will cause the torque of the engine 12 to be outputted from the one-way bearing 28. The transmission of torque between the motor-generator 10 and the driven wheels 14 or between the engine 12 and the driven wheels 14 without the power split device 20 is achieved by disengaging the clutch C3. The output of the engine 12 or the motor-generator 10 is converted in speed by the CVT 22 and then transmitted to the driven wheels 14.

When the vehicle is being run by the engine 12, the motor-generator 10 does not necessarily need to be operated as an electric motor, but may be used as a generator.

Switching from First Operation Mode to Second Operation Mode

Figure 6A:
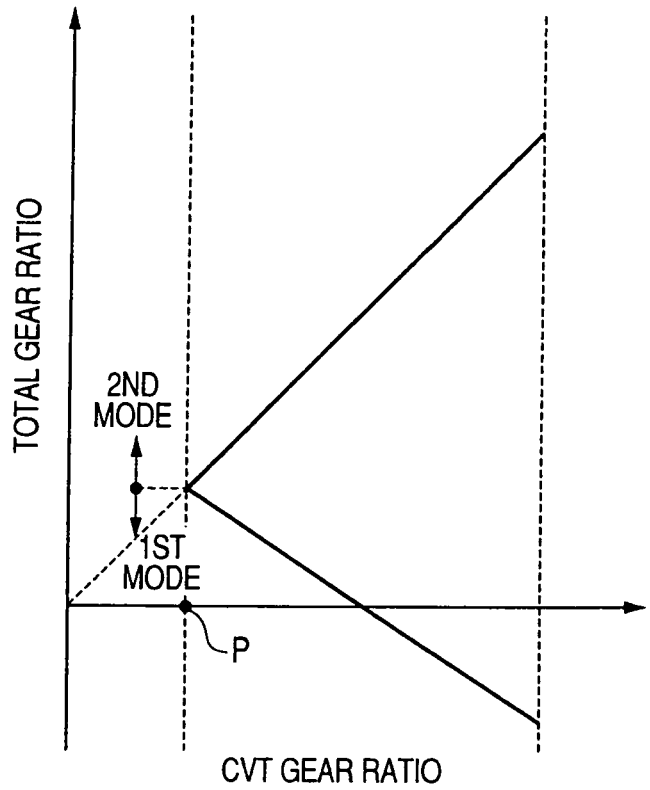
FIG. 6(a) is a graph which shows a relation between a total gear ratio of a power transmission device of the first embodiment and a gear ratio of a CVT.

FIG. 6(a) illustrates a relation between a total gear ratio (i.e., a total output-to-input speed ratio) of the power transmission path extending from the motor-generator 10 or the engine 12 to the driven wheels 14 and the gear ratio of the CVT 22 when the driven wheels 14 are run by the motor-generator 10 or the engine 12. The gear ratio, as referred to herein, may also be expressed by either of an output-to-input speed ratio or an input-to-output speed ratio depending upon which of the input speed and the output speed is considered to be a basis. When the first operation mode is entered, the controller 40 may change the gear ratio of the CVT 22 continuously to change the direction in which the vehicle travels from the backward to the forward direction. When a given gear ratio of the CVT 22 is reached, the operation mode of the power transmission device is switched to the second operation mode, thereby increasing a range in which the total gear ratio is permitted to be changed.

Specifically, the power transmission device is capable of changing the gear ratio of the CVT 22 in the first operation mode, as demonstrated in FIG. 6(a), to change the rotational direction of the driven wheels 14 from the backward direction to the forward direction continuously through the instant where the speed of the driven wheels 14 is zero and subsequently changing the gear ratio of the CVT 22 further to increase the total gear ratio in a power transmission path from the motor-generator 10 to the driven wheels 14. When the time the omission of the transmission of torque will not occur is reached, in other words, a mode-switching point P is reached, the power transmission device is operable to switch the first operation mode to the second operation mode and then turn the CVT 22 in the opposite direction (which will also be referred to as a CVT reversing operation below) to increase the total gear ratio further.

The above operation is achieved by selecting the direction in which the total gear ratio changes with a change in gear ratio of the CVT 22 in the second operation mode to be opposite that in the first operation mode. This is established in the condition that a derivative value of a function in which the gear ratio of the CVT 22 is expressed by an independent variable, and the total gear ratio is expressed by a dependent variable with respect to the gear ratio of the CVT 22 in the second operation mode is opposite in sign to that in the first operation mode. This condition is realized by the gears G2α, G2β, and G5. Specifically, the possibility of the CVT reversing operation is dependent upon the sign of a product of gear ratios of the gears G2α, G2β, and G5. Conditions in which the CVT reversing operation is feasible will be given by a section "TOTAL GEAR RATIO", as will be discussed in the last section of this application.

The controller 40 performs the above first-to-second operation mode switching under the condition that the total gear ratio, that is, a ratio of an output speed that is the speed of the driven wheels 14 to an input speed that is the speed of the motor-generator 10 or the engine 12 is not changed. This condition is met when speeds of an input and an output of the clutch C1 are identical with each other, and speeds of an input and an output of the clutch C2 are identical with each other. The first-to-second operation mode switching may, therefore, be made through the time when both the clutches C1 and C2 are engaged simultaneously, thus avoiding the omission of transmission of torque to the driven wheels 14.

The omission of transmission of torque to the driven wheels 14 is avoided by the means of the gears G2α, G2β, and G5. The planetary gear set 70 (i.e., the power transmission device 20) is, as described above, so constructed that the speeds of the sun gear S, the carrier C, and the ring gear R of the power split device 20 are either all identical with or all different from each other. Specifically, the power split device 20 is, as can be seen from FIG. 2(a), so designed that the speeds of rotation (or the rotational directions) of the sun gear S and the ring gear R are opposite in sign to each other in the nomographic chart. The sun gear S, the carrier C, and the ring gear R are, thus, different in speed from each other except when they are all zero (0). It is, therefore, impossible for only the CVT 30 to realize the condition that speeds of the input and the output of the clutch C1 are identical with each other, and speeds of the input and the output of the clutch C2 are identical with each other. Accordingly, the power transmission device of this embodiment has the gear G5, G2α, and G2β to ensuring the stability in engagement of the clutches C1 and C2 without the omission of transmission of torque to the driven wheels 14. Specifically, the gear G5 disposed between the ring gear P of the power split device 20 and the clutch C2 serves as a fist-to-second operation mode switching speed variator to compensate for a difference in speed between the sun gear S and the ring gear R when the first operation mode is switched to the second operation mode. The gear G5 may alternatively disposed between the sun gear S and the clutch C2. Similarly, either or both of the gears G2α and G2β disposed between the carrier C of the power split device 20 and the clutch C1 serve as a second-to-first operation mode switching speed variator to compensate for a difference in speed between the sun gear S and the carrier C when the second operation mode is switched to the first operation mode. The gear ratios (i.e. input-to-output speed ratios) of the gears G2α, G2β, and G5 and the CVT 22 required to avoid the omission of transmission of torque to the driven wheels 14 will be discussed later in the section "TOTAL GEAR RATIO".

Figure 6B:
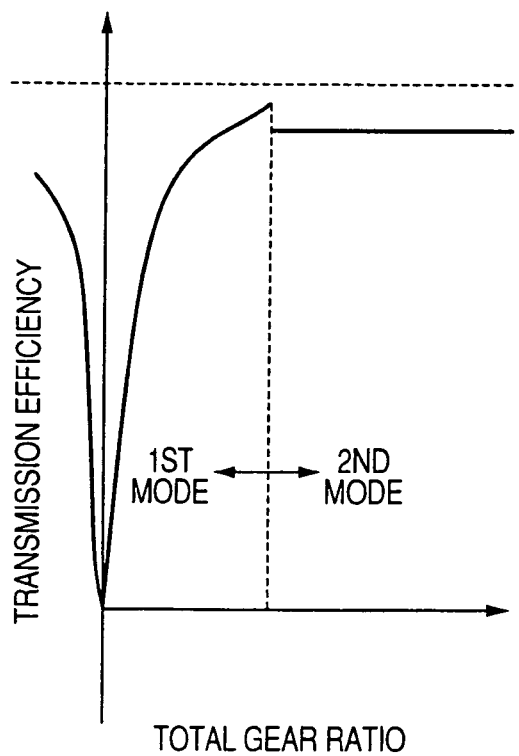
FIG. 6(b) is a graph which shows a relation between a total gear ratio of a power transmission device of the first embodiment and a power transmission efficiency.

As apparent from the above discussion, the switching from the first operation mode to the second operation mode results in an increased range in which the total gear ratio is permitted to be changed. This allows the CVT 22 to be reduced in size. In the second operation mode, the power is not circulated, thus enabling the power transmission efficiency that is the ratio of input energy to output energy in the power transmission device to be increased as compared with, in the first operation mode. FIG. 6(b) is a graph which represents a relation between the power transmission efficiency and the total gear ratio. The graph shows that a very low range of the power transmission efficiency exists in the first operation mode, but not in the second operation mode. In the graph of FIG. 6(b), the power transmission efficiency in the first operation mode immediately before switched to the second operation mode is illustrated as being higher than that in the second operation mode, but it does not mean that the power transmission efficiency when the power transmission device is designed to operate only in the first operation mode is higher than when the power transmission device is designed to be switched between the first and second operation modes.

The controller 40 actuates the power transmission device in the first operation mode to permit the driven wheels 14 to be rotated in the forward and backward directions and stopped as needed without having to change the sign of speed (i.e., the direction of rotation) of the motor-generator 10 even though the power transmission efficiency is low. The controller 40 switches from the first operation mode to the second operation mode in a range where the speed of the driven wheels 14 is higher than a given value, thereby improving the power transmission efficiency and increasing the range where the total gear ratio is permitted to be changed. When the power transmission device is switched to the second operation mode, it results in no need for the power split device 20 to transmit the power to the driven wheels 14, but the carrier C of the power split device 20 may be used to apply initial torque (i.e., starting torque) to the engine 12. In other words, when it is required to start the engine 12 in the second operation mode, one of the rotors of the planetary gear set 70 which needs not be used in transmitting the power to the driven wheels 14 may be employed to start the engine 12.

The structure of the hybrid system (i.e., the power transmission device) of this embodiment offers the following advantages.

1) The power transmission device is so designed that when it is required to output torque from an engine starting rotor (i.e., the carrier C) of the power split device 20 to start the engine 12, the power will be circulated between the other power split rotors (i.e., the sun gear S and the ring gear 12), thereby facilitating ease of decreasing the speed of the engine starting rotor (i.e., the carrier C) to a very low speed or zero (0), which will minimize mechanical vibrations exerted on the power split device 20 when the initial torque is applied to the engine 10.

2) In the second operation mode, the power split rotors of the power split device 20 other than the engine starting rotor (i.e., the carrier C) are coupled mechanically together through the CVT 22. This permits the inclination of the straight line on which the power split rotors are arrayed in speed in the nomographic chart, as already described, to be changed by controlling the gear ratio of the CVT 22, in other words, the speed of the engine starting rotor (i.e., the carrier q to be controlled variably by selecting the gear ratio of the CVT 22 regardless of the speed of the driven wheels 14.

3) In the second operation mode, the clutch C3 is in the disengaged state except when the engine 12 is started, thereby permitting the power to be transmitted from the motor-generator 10 or the engine 12 to the driven wheels 14 without the power split device 20.

4) When it is required to transmit the output of the motor-generator 10 to the driven wheels 14 in the second operation mode, the CVT 22 is disposed in connection between the motor-generator 10 and the driven wheels 14, thus permitting the speed of the motor-generator 10 to be changed by the CVT 22.

5) The engine 12 is placed in power transmitting communication with the sun gear S and the CVT 22 to transmit power of the engine 12 to the sun gear S and the CVT 22 after start-up of the engine 12. In other words, the engine starting rotor (i.e., the carrier C) which is to be placed in power transmitting communication with the rotating shaft 12a when it is required to start the engine 12 is different from a power transmitted rotor (i.e., the sun gear S) which is to be placed in power transmitting communication with the engine 12 and to which the power is transmitted from the engine 12 when it is required to rotate the driven wheels 14, thus enabling the speed of the engine 12 to be brought to an effective speed range quickly. The power transmitted to the sun gear S is hardly outputted from the ring gear R. Most of the power is transmitted to the driven wheels 14 through the CVT 22.

6) When it is required to transmit the output of the engine 12 to the driven wheels 12 in the second operation mode, the CVT 22 is disposed in connection between the engine 12 and the driven wheels 14, thus permitting the speed of the engine 12 to be changed by the CVT 22.

7) The one-way bearing 28 is disposed between the engine 12 and the sun gear S to establish the transmission of torque from the engine 12 to the sun gears S under the condition that the speed of the input of the one-way bearing 28 (i.e., the speed of the rotating shaft 12a of the engine 12) is not lower than that of the output of the one-way bearing 28 (i.e., the speed of the sun gear S), thus causing the torque to be transmitted from the engine 12 to the sun gear S when the speed of the input of the one-way bearing 28 reaches that of the output thereof. This facilitates the ease of starting to supply the torque of the engine 12 to the sun gear S.

8) The switching between the first operation mode and the second operation mode makes mechanical connections among the motor-generator 10, the engine 12, and the driven wheels 14 suitable for operational conditions thereof.

9) The power transmission device is so designed that when the sign of the speed of the motor-generator 10 (or the engine 12) is fixed to be either plus or minus, the signs of power of the carrier C and the sun gear S will be opposite to each other in the first operation mode, while the powers of the sun gear S and the ring gear R will be zero (0) in the second operation mode. This causes the power to be circulated between the rotors of the power split device 20 other than connected mechanically to the driven wheels 14 in the first operation mode, thus permitting the geared neutral to be established desirably. The power is not circulated in the second operation mode, thus resulting in an increase in power transmission efficiency. No need also arises to reverse the motor-generator 12 (or the engine 10) upon the switching between the first and second operation modes.

10) The CVT 22 is operable both in the first and second operation modes, thus resulting in a decrease in part of the power transmission device.

11) A first order derivative value of a function, in which the gear ratio of the CVT 22 is expressed by an independent variable, and the total gear ratio in the power transmission path between the power source (i.e., the motor-generator 10 or the engine 12) and the driven wheels 14) is expressed by a dependent variable, with respect to the gear ratio of the CVT 22 (i.e., the independent variable) in the second operation mode is set opposite in sign to that in the first operation mode. This enables the CVT reversing operation to broaden the range in which the total gear ratio is permitted to be changed.

12) The power transmission device is equipped with a mechanical measure (i.e., the gears G1α, G2β, and G5) which compensates for a difference in speed between the carrier C and the ring gear R, thereby eliminating the instantaneous omission of transmission of torque to the driven wheels 14 upon the switching between the first operation mode and the second operation mode.

13) The power transmission device is equipped with the electronically-controlled clutch C3 to establish or block the to transmission of torque between the engine starting rotor (i.e., the carrier C) of the power split device 20 and the rotating shaft 12a of the engine 12, thereby avoiding an error in transmission of torque from the engine starting rotor to the engine 12 before the engine 12 is started, which minimizes consumption of energy or power in the power transmission device.

14) The power transmission device is also equipped with the one-way bearing 26 which establishes the transmission of torque from the power slit device 20 to the rotating shaft 12a of the engine 12 under the condition that the speed of the input of the one-way bearing 26 (i.e., the speed of the engine starting rotor) is not lower than that of the output of the one-way bearing 26 (i.e., the speed of the rotating shaft 12a of the engine 12), thereby avoiding the transmission of torque from the engine 12 to the engine starting rotor when the torque is produced upon start of combustion of fuel in a combustion chamber of the engine 12, so that the speed of the rotating shaft 12a of the engine 12 rises quickly. This is because when the speed of the output of the one-way bearing 26 (i.e., the speed of the rotating shaft 12a) is elevated above that of the input of the one-way bearing 26, the one-way bearing 26 blocks the transmission of torque from the output to the input of the one-way bearing 26. This avoids the transmission of torque pulsation to the operator of the vehicle.

15) The clutches C1 and C2 are, as illustrated in FIG. 1(b), coupled directly to the common shaft of the power transmission device, thus facilitating the ease of arranging the clutches C1 and C2 close to each other, which permits the size of the power transmission device to be reduced.

Figure 7:
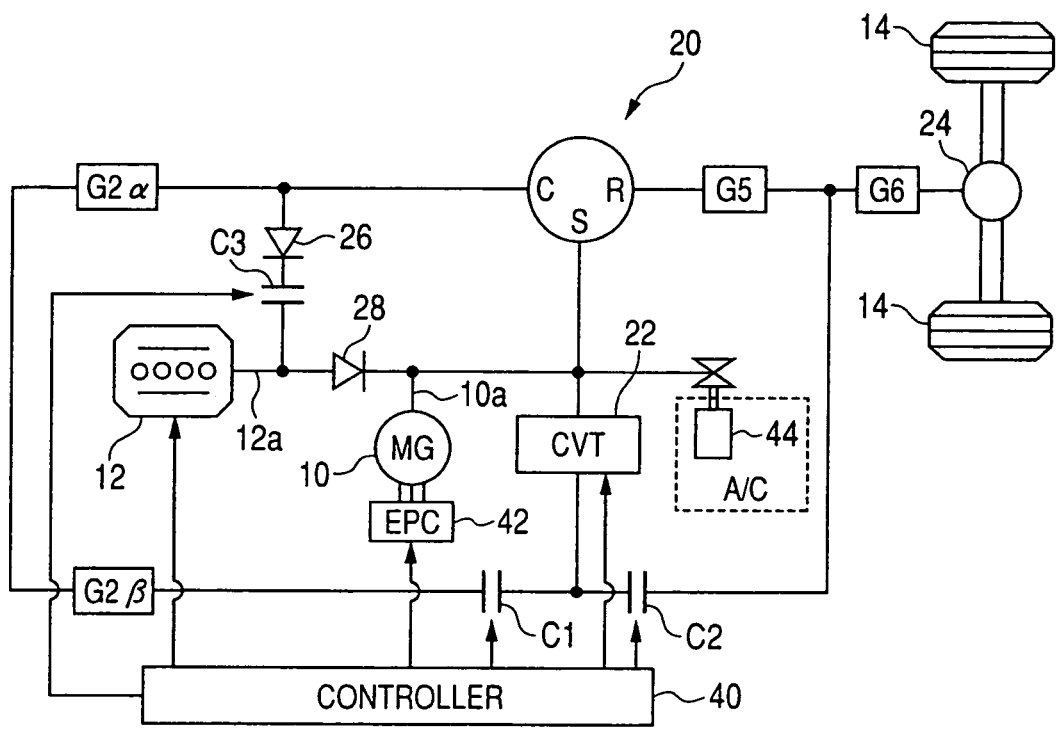
FIG. 7 is a block diagram which illustrates a power transmission device according to the second embodiment of the invention.

FIG. 7 illustrates a hybrid system according to the second embodiment of the invention. The same reference numbers as employed in FIG. 1 refer to the same or similar parts, and explanation thereof in detail will be omitted here.

An conditioner A/C (i.e., a vehicle accessory) is installed in the hybrid vehicle and powered by the power split device 20. The air conditioner A/C is equipped with a compressor 44 which has a driven shaft connected mechanically to the sun gear S of the power split device 20, so that the torque is supplied from the sun gears S to the driven shaft of the compressor 44. The power transmission device is as described above, capable of rotating the sun gear S at speeds other than zero (0) when the driven wheels 14 are at rest and thus running the air conditioner A/C when the vehicle is parked.

The hybrid system of this embodiment is capable of keeping the efficiency in operation of the motor-generator 10 high when actuating the compressor 44 while the vehicle is stopped. This is achieved by the structure which ensures the torque required to start the vehicle without having to increase the size of the motor-generator 10. In other words, the structure of the power transmission device of this embodiment eliminates the need for increasing the size of the motor-generator 10 to actuate the air conditioner A/C. In this embodiment, a maximum amount of power required to be outputted from the motor-generator 10 to the compressor 44 is 25% to 50% of a maximum amount of power to be outputted from the motor-generator 10. The efficiency of the motor-generator 10 usually decreases as the output therefrom decreases in a range up to a certain output which is smaller than a maximum output of the generator-motor 10. Therefore, the efficiency of the motor-generator 10 is enabled to be kept high when the motor-generator 10 is run only for driving the compressor 44. A maximum output of motor-generators such as ones mounted in conventional hybrid vehicles is usually 50 kW or more which is ten or more than dozen times a maximum required output of the compressor 44 (e.g., several kW). This causes the motor-generator 10 to be run to drive the compressor 44 with a low efficiency when the vehicle is at a stop.

When a required output of the motor-generator 10 is increased with a increase in required traveling performance of the vehicle, the output of the motor-generator 10 may be used mainly to run the vehicle by limiting the amount of energy to drive the compressor 44. Such an increase in output of the motor-generator 10 is usually required to enhance the drivability of the vehicle when being accelerated. The increase in size of the motor-generator 10 in order to meet such a requirement leads to great concern about an increase in production cost thereof. In contrast, the structure of the power transmission device of this embodiment may work to restrict the energy or power required to drive the compressor 44 to ensure the ability to accelerate the vehicle without having to increase the size of the motor-generator 10, which results in improvement on the drivability of the vehicle.

The joining of the compressor 44 to the sun gear S does not impinge on the circulation of power, as described in the first embodiment, at all. The structure of the power transmission device of this embodiment, therefore, has the same advantages as those in the first and second operation modes in the first embodiments.

This embodiment also offers an additional beneficial effect below.

16) The use of the power split device 20 as a power source for the compressor 44 eliminates the need for an additional electric motor to drive the compressor 44.

Other Embodiments

The power transmission devices of the above embodiments may be modified as discussed below.

Type of Speed Variator

The CVT 22 needs not be of a belt-type. For example, a traction drive type or hydraulic continuously variable transmission may be used. Alternatively, a gear transmission may be used instead of the CVT 22.

Joint Between Motor-Generator and Power Split Device

Figure 8:
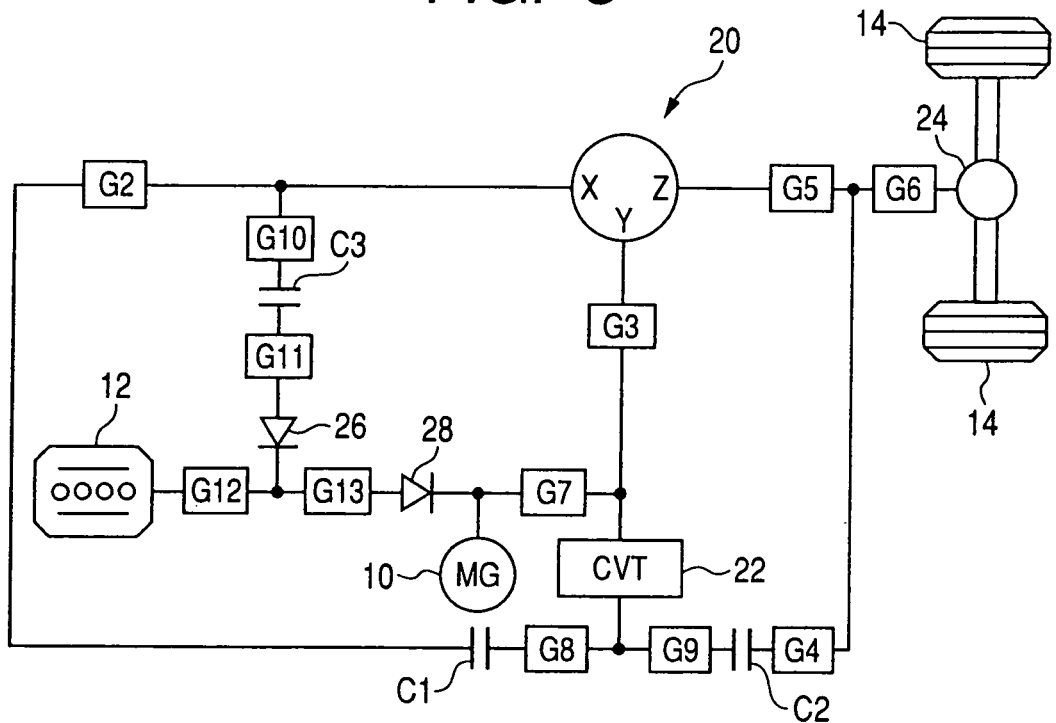
FIG. 8 is a block diagram which illustrates a modification of a power transmission device which may be used in a structure of each of the first and second embodiment.

Mechanical joints among the motor-generator 10, the engine 12, the driven wheels 14, and the power split rotors (i.e., the sun gear S, the carrier C, and the ring gear R) may be modified as shown in FIG. 8.

FIG. 8 illustrates the mechanical joints among parts of the power transmission device in the case where the power split device 20 is made only of a single planetary gear set. The clutch C3 is coupled to the input of the one-way bearing 26, but may alternatively be connected to the output of the one-way bearing 26. All possible combinations of the power split rotors x, y, and z of the power split device 20 (i.e., the sun gear S, the carrier C, and the ring gear R) are (x, y, z)=(S, C, R), (S, R, q, (C, S, R), (C, R, S), (R, S, C), and (R, C, S).

By using some of the gears G2 to G13 in the power transmission device, the circulation of power between the power split rotors x and y is achieved in the first operation mode or between the power split rotors y and z in the second operation mode when the clutch C3 is engaged. Additionally, the omission of transmission of torque to the driven wheels 14 or the CVT reversing operation is also achieved by using some of the gears G2 to G13 in the power transmission device.

Each of the gears G2 to G13 may be implemented by a speed increasing gear set, a speed reducing gear set, or a counter gear whose gear ratio is fixed. Each of the gears G2 to G13 may alternatively be implemented by a mechanism using a chain or a belt.

Figure 9:
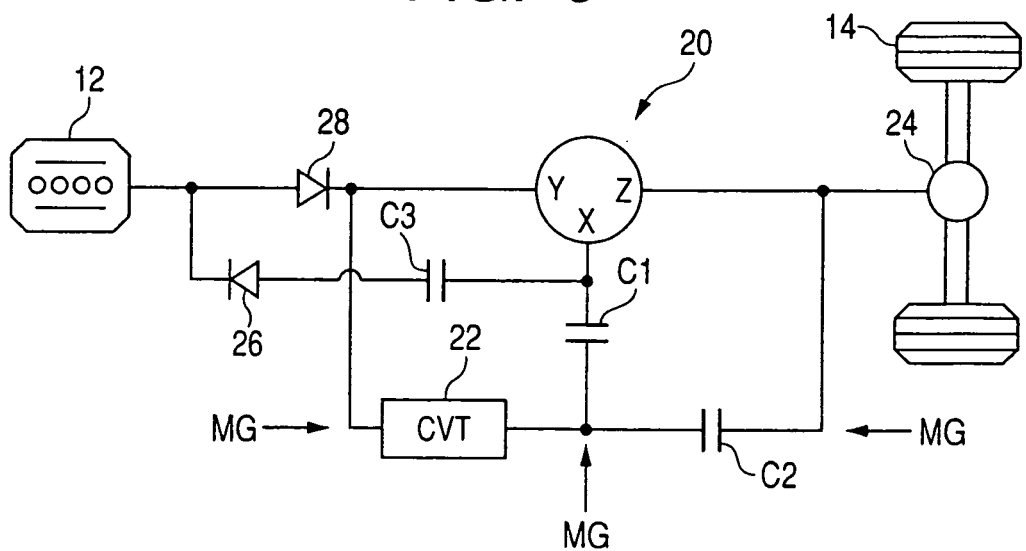
FIG. 9 is a block diagram which illustrates a second modification of a power transmission device which may be used in a structure of each of the first and second embodiment.
Figure 10:
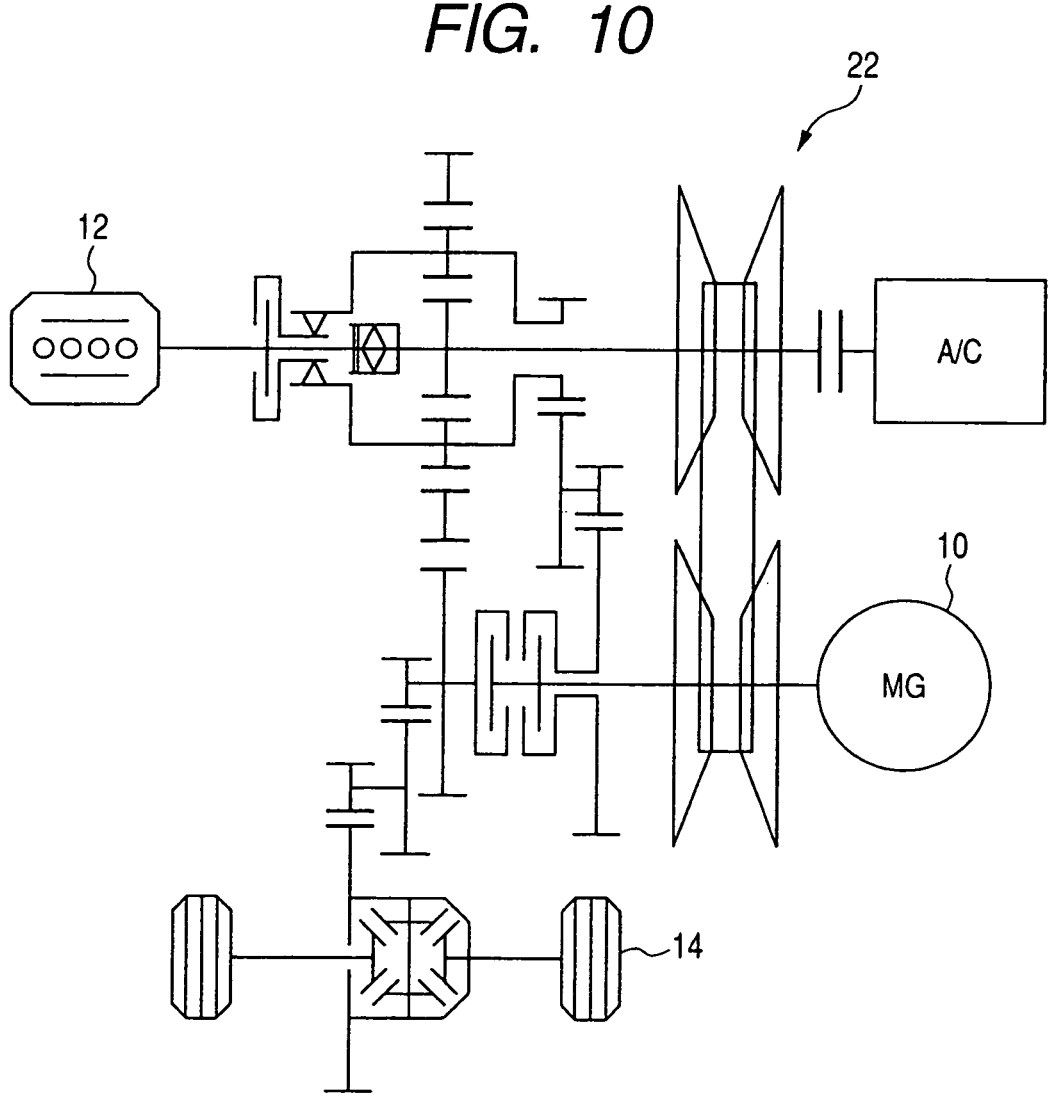
FIG. 10 is a view which illustrates a modification of a power transmission device of the second embodiment.
Figure 11:
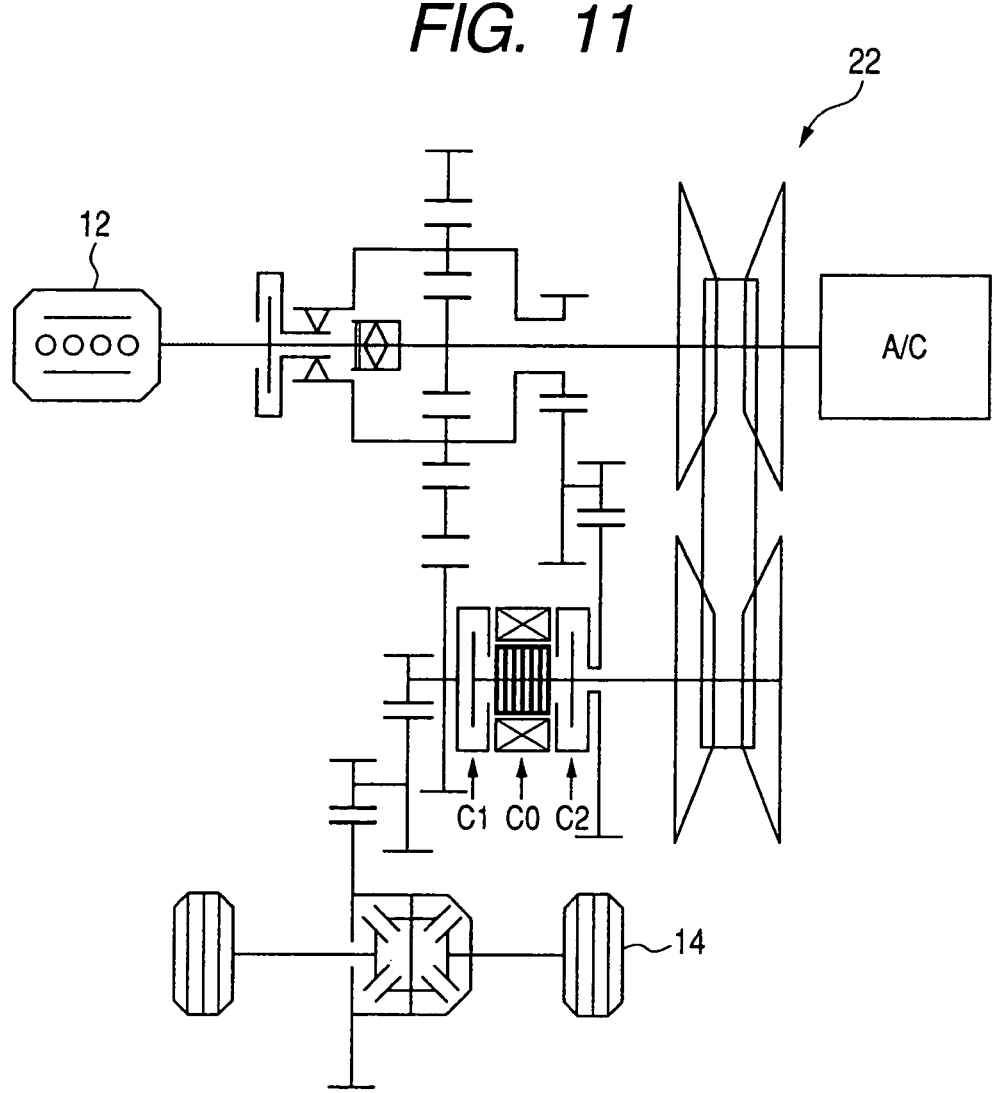
FIG. 11 is a view which illustrates a second modification of a power transmission device of the second embodiment.

The motor-generator 10 may alternatively be, as illustrated in FIG. 9, coupled mechanically to a junction between the one-way bearing 28 and the CVT 22, a junction between the clutches C1 and C2, or a junction between the clutch 22 and the driven wheels 14. In the case where the power split rotors x, y, and z of the power split device 20 are, like in FIG. 8, the carrier C, the sun gear S, and the ring gear R, respectively, the arrangements of the motor-generator 10, as denoted by "MG" on the left side and the middle of the drawing, correspond to those of FIG. 1(*a*) and FIG. 1(*c*), respectively. All possible combinations of the power split rotors x, y, and z of the power split device 20 are (x, y, z)=(S, C, R), (S, R, C), (C, S, R), (C, R, S), (R, S, C), and (R, C, S). The motor-generator 10 may be, as clearly shown inn. FIG. 9, joined mechanically to one of the input of the CVT 22, the junction between the clutches C1 and C2, and the output of the clutch C2. FIG. 9 omits gears for sake of convenience. FIGS. 10 and 11 are skeleton views which illustrate modifications of the mechanical connections of the motor-generator 10 to parts of the power transmission device. In FIG. 11, the motor-generator 10 is installed between the clutches C1 and C2.

Figure 12:
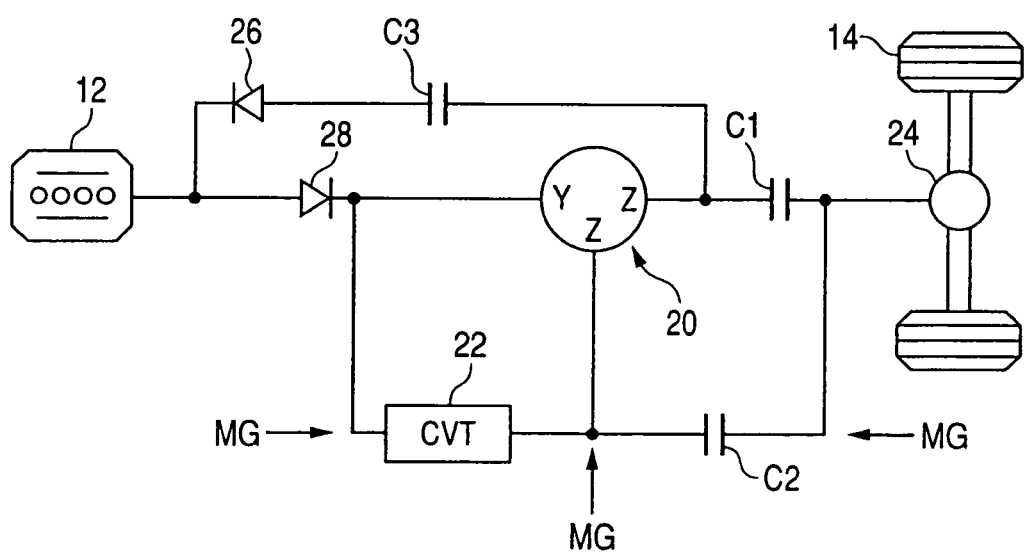
FIG. 12 is a block diagram which illustrates a third modification of a power transmission device which may be used in a structure of each of the first and second embodiment.

FIG. 12 illustrates a modification of the mechanical joints of the motor-generator 10, the engine 12, and the driven wheels 14 to the power split rotors; y, and z of the power split device 20. The clutches C1 and G2 are disposed one in each of two power transmission paths extending between the power split device 20 and the driven wheels 14. Like in the above modifications, all possible combinations of the power split rotors x, y, and z of the power split device 20 are (x, y, z)=(S, C, R), (S, R, C), (C, S, R), (C, R, S), (R, S, C), and (R, C, S).

Layout of Speed Variator (CVT 22)

The speed variator, i.e., the CVT 22 needs not necessarily be disposed at a location useful both in the first and second operation modes, but may be utilized in either of the first and second operation modes. Instead of the CVT 22, the power transmission device may be equipped with a plurality of speed variators one or more of which are used in the first operation mode, and remaining one or more of which are used in the second operation mode. For instance, in the structure of FIG. 8, a first variator may be disposed between the power split rotors x and y, while a second variator may be disposed between the power split rotors y and z.

Power Split Rotors

The power split device 20, as used in the above embodiments, is so designed that when the signs of rotational speeds (i.e., directions of rotation) of the sun gear S and the ring gear R are opposite each other, the speed of the carrier C is zero (0), but may alternatively be designed that when the signs of rotational speeds of the sun gear S and the ring gear R are identical with each other, the speed of the carrier C is zero (0). This is realized by, for example, a double pinion planetary gear set such as one, as disclosed in Japanese Patent First Publication No. 2001-108073.

Figure 13A:
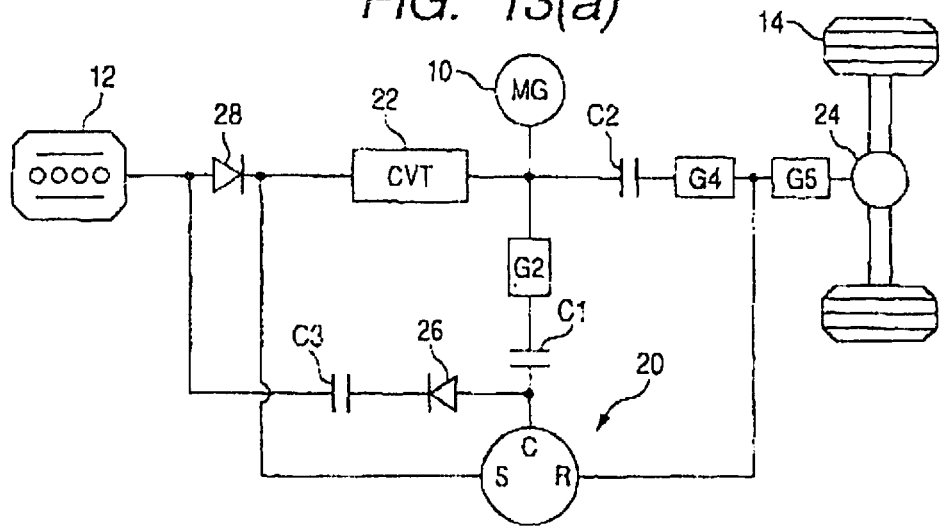
FIG. 13(a) is a block diagram which illustrates a fourth modification of a power transmission device which may be used in a structure of each of the first and second embodiment.
Figure 13B:
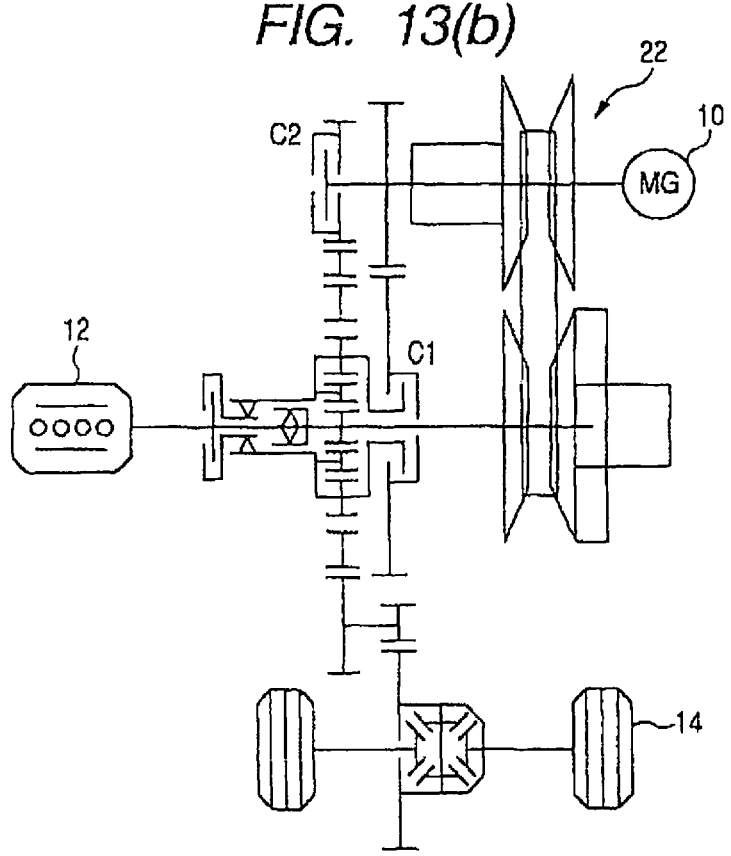
FIG. 13(b) is a view of power transmission paths of the power transmission device of FIG. 13(a)
Figure 14A:
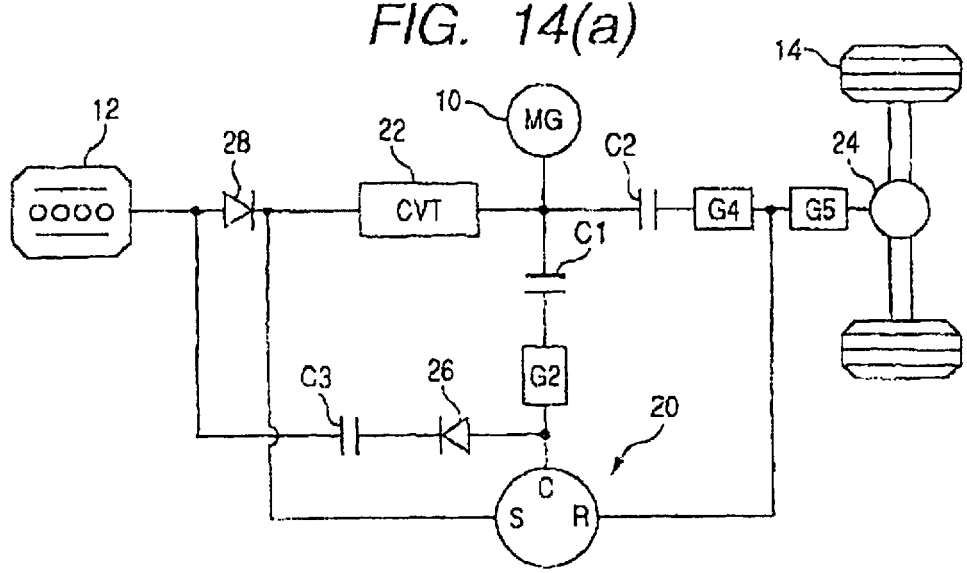
FIG. 14(a) is a block view which illustrates a fifth modification of a power transmission device which may be used in a structure of each of the first and second embodiment.
Figure 14B:
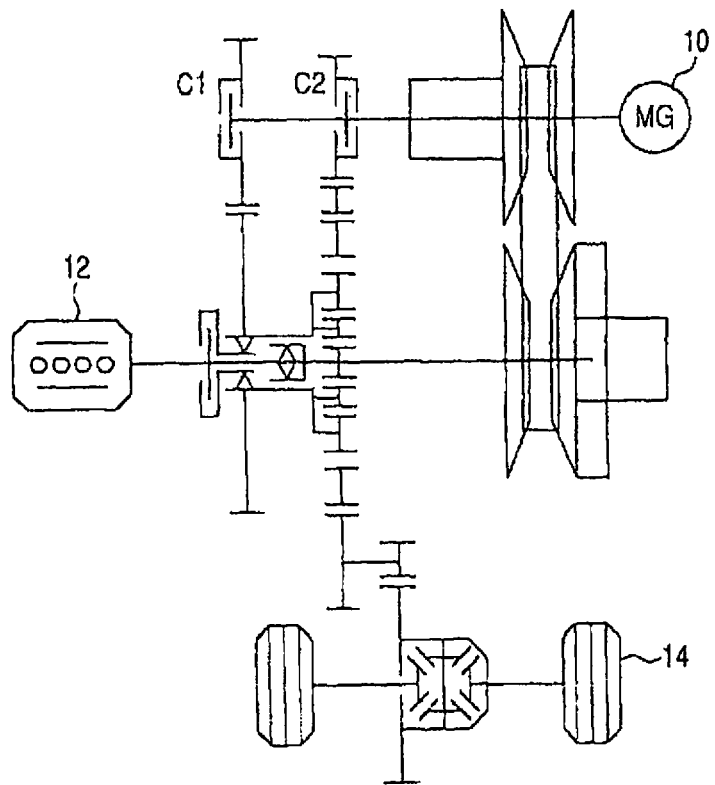
FIG. 14(b) is a view of power transmission paths of the power transmission device of FIG. 14(a)

FIGS. 13(*a*) to 14(*b*) illustrate examples in which the power split device 20 is equipped with the double pinion planetary gear set. The same reference numbers, as employed in the above embodiments, refer to the same or similar parts. The gear G2 is a counter gear. The gears G4 and G5 are a forward gear (also called a normal rotation gear).

The power split device 20 may be made only by a differential gear or to additionally include it.

Torque Transmission Control Mechanism

The torque transmission control mechanism which establishes or blocks the transmission of torque from the engine starting rotor (i.e., the carrier C) of the power split device 20 to the rotating shaft 12a to start the engine 12 is made up of the clutch C3 and the one-way bearing 26, but may alternatively be equipped with only the clutch C3. In this case, unwanted transmission of torque which will be increased usually suddenly upon start of combustion of fuel in the engine 12 to the power slit device 20 may be avoided by disengaging the clutch C3 prior to the start of combustion of fuel after an initial rotation is given to the rotating shaft 12a of the engine 12. The torque transmission control mechanism may also be made by only the one-way bearing 26. In the case where the engine 12 is permitted to rotate only in one direction, the power transmission device 20 is actuated only in a range where the sign of speed (i.e., the rotational direction) of the engine starting rotor (i.e., the carrier C) connected mechanically to the input of the one-way bearing 26 is not reversed.

The clutch C3 may alternatively be joined to the output of the one-way bearing 26.

Instead of the one-way bearing 26 which transmits torque to the engine 12 when the speed of the engine starting rotor (i.e., the carrier C) of the power split device 20 is greater than that of the rotating shaft 12a of the engine, a one-way clutch or another similar type mechanism working to have the rotating shaft 12a follow the rotation of the engine starting rotor of the power split device 20 with or without any slip may be used.

The clutch C3 which selectively blocks the transmission of torque from the power split device 20 to the rotating shaft 12a to start the engine 12 is of a normally open type, but may be of a normally closed type.

Torque Applying Mechanism

Instead of the one-way bearing 28 working as a torque applying mechanism to connect the power transmitted rotor (i.e., the sun gear S of the power slit device 20 to the rotating shaft 12a of the engine 12 to apply torque, as produced by the engine 12, to the driven wheels 14, a one-way clutch may be used. A one-way power transmitting mechanism which has an output member following rotation of an input member thereof leading to the rotating shaft 12a of the engine 12 with or without any slip may be used to transmit torque from the engine 12 to the driven wheels 14 when the speed of the input member coupled to the engine 12 is higher than that of the output member coupled to the power split device 20.

Instead of the one-way power transmitting mechanism, a clutch may be used, it is advisable that the clutch be engaged when speeds of the input and output members have been brought into agreement with each other by controlling speeds of the engine 12 and the power transmitted rotor of the power split device 20 in order to minimize mechanical vibrations of the power split device upon engagement of the clutch.

Accessory Powered by Torque of Power Split Rotor

In addition to the compressor 44 of the air conditioner, the power split device 20 may be connected to supply power to a brake pump which produces hydraulic pressure for applying braking force to the driven wheels 14, a water pump for coolant of the engine 12, or a cooling fan for the engine 12.

Power Split Rotor Coupled to Accessory

One of the power split rotors other than the sun gear S, as illustrated in FIG. 7, may be coupled mechanically to the accessory (also called an auxiliary device) such as the compressor 44 installed in the vehicle. The accessory may be connected mechanically between the clutch C3 and the one-way bearing 26 in FIG. 7. This connection will result in the circulation of power in the second operation mode even at a time other than when the engine 12 is started, thus leading to a decrease in power transmission efficiency, but offering the advantages that the speed of the carrier C is permitted to be adjusted to zero (0) or another value while the vehicle is running and that the power is permitted to be supplied to the accessory both in the first and second operation modes even when the vehicle is stopped.

Engine Starting Operation

Figure 15A:
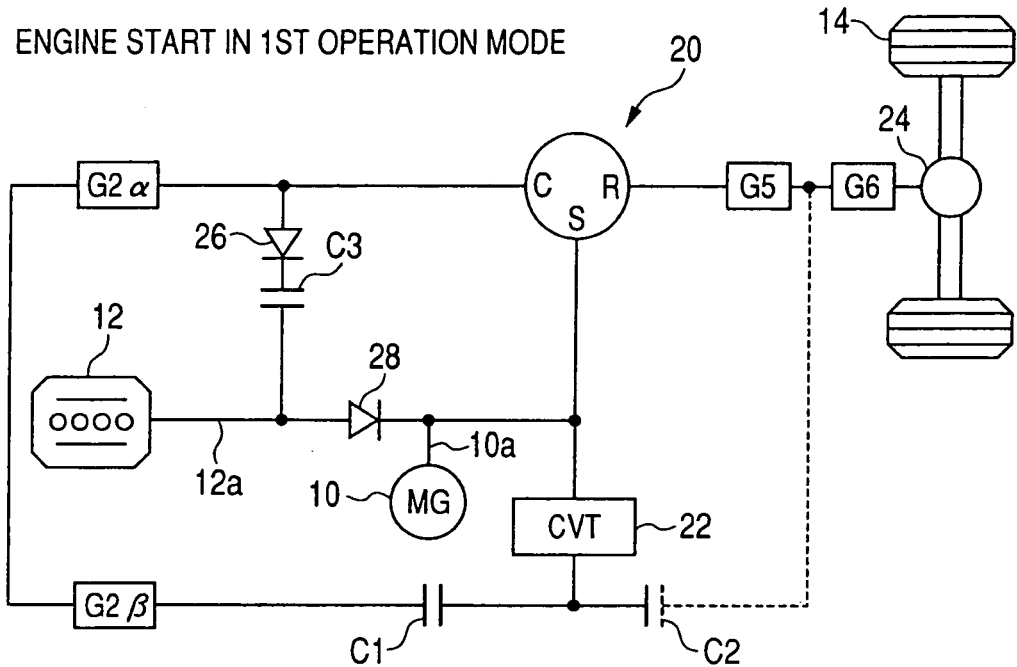
FIG. 15(a) is a schematic block diagram which shows a power transmission path of a power transmission device when an internal combustion engine is started by a motor-generator in a first operation mode.
Figure 15B:
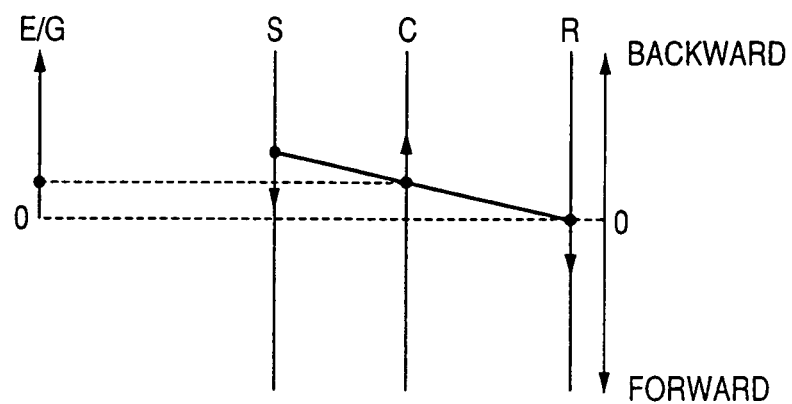
FIG. 15(b) is a nomographic chart which represents an operation of a power split device of FIG. 15(a) along with the speed of an internal combustion engine.

The engine 12 may alternatively be started in the first operation mode. Specifically, the controller 40 may start the engine 12 when the vehicle is stopped and then use the power to move the vehicle. FIG. 15(a) illustrates a power transmission path of the power transmission device of the first embodiment when starting the engine 12 in the first operation mode. FIG. 15(b) illustrates a nomographic chart when the engine 12 is started while the vehicle is at a stop. When it is required to start the engine 12, the controller 40 engages the clutch C2 to transmit the power from the carrier C to the rotating shaft 12a of the engine 12. After the engine 12 is fired up, the torque, as produced by the engine 12, is transmitted to the driven wheels 14 through the one-way bearing 28 and the power split device 20 to start the vehicle. The power transmission device of this structure is enabled to establish the geared neutral in the is first operation mode which keeps the speed of the driven wheels 14 at zero (0) even when the torque is transmitted from the engine 12 through the one-way bearing 28. This eliminates the need for a torque converter. The engine 12 may alternatively be started in the second operation mode.

The engine 12 may also be started regardless of whether the power transmission device is in the first or second operation mode. For example, the controller 40 may start the engine 12 when the clutches C1 and C2 are both disengaged. Specifically, the controller 40 locks the driven wheels 14 through a brake when the vehicle is at a stop, engages the clutch C3, and actuates the motor-generator 10 to supply the power from the motor-generator 10 to the rotating shaft 12a of the engine 12 through the power split device 20, the one-way bearing 26, and the clutch C3.

The power of the carrier C needs not necessarily be outputted from the power split device 20 to start the engine 12 after a difference in speed between the carrier C and the rotating shaft 12a is placed below a given value. When such a speed difference is greater than the given value, the controller 40 may increase the degree of engagement of the clutch C3 gradually, in other words, keep the clutch C3 in a partially engaged state and then supply the power to the rotating shaft 12a.

Condition to Engage Clutch C3

When the speed of the engine 12 is below a minimum value needed to ensure the stability in operation of the engine 12, and an engine starting request is mad; the controller 40 engages the clutch C3 in the above embodiments, but may alternatively make such engagement when it is required to brake the vehicle. This is enabled in the structure of the first and second embodiments designed to ensure the engine starting torque even when the motor-generator 10 is reduced in size. The reduction in size of the motor-generator 10 to a degree that generates up to several tens kW may result in a difficulty in increasing the braking force to be produced by a regenerative operation of the motor-generator 10 to a required level. However, the power transmission device of the first or second embodiment is enabled to engage the clutch C3 and exert a resistive load from the engine 12 to the power split device 20 to produce engine braking.

When Vehicle is Stopped or Towed

When the vehicle is stopped or towed, the controller 40 preferably disengages the clutches C1 and C2. This avoids the rotation f the CVT 22 following the towing of the vehicle, thereby minimizing the deterioration of the CVT 22 even equipped with a metal belt. For example, in the structure of FIG. 1, when the controller 40 disengages both the clutches C1 and C2, it causes the generator-motor 10 to hold the CVT 22 from rotating, and permits the clutches C1 and C2 to idle. Basically, such an operation is achieved both in the first and second operation modes by the structure of the power transmission device in which the CVT 22 is disposed in a looped path extending between the two power split rotors of the power split device 20, and the motor-generator 10 is joined mechanically to one of the ends of the CVT 22, FIG. 17 shows a sequence of logical steps which may be executed by the controller 40 of the first embodiment at a regular interval when the vehicle is stopped.

After entering the program, the routine proceeds to step 10 wherein it is determined whether a travel permission switch 95 is turned off or not. The travel permission switch 95 is a switch to be turned on or off by a vehicle operator to permit the vehicle to travel. The travel permission switch 95 may be designed to be turned on or off in a wireless fashion when a portable wireless device carried by the vehicle operator is close to a vehicle controls system equipped with the controller 40. For example, when the travel permission switch 95 is turned on, the inverter 42 is connected electrically to a storage battery installed in the vehicle. If a YES answer is obtained meaning that the travel permission switch 95 is in the off-state, then the routine proceeds to step 12 wherein the controller 40 disengages the clutch C1 and C2. If a NO answer is obtained in step 10 or after step 12, the routine terminates.

The controller 40 may engage the clutch C1 and C2 and then set the total gear ratio of the power transmission device to a given high-speed gear ratio or alternatively change the gear ratio of the CVT 22 to have values different between the first and second operation modes and then engage the clutches C1 and C2, thereby locking the driven wheels 14.

FIG. 18 shows a modification of a sequence of logical steps which may be executed by the controller 40 of the first embodiment at a regular interval when the vehicle is stopped. The same step numbers as employed in FIG. 17 refer to the same operations, and explanation thereof in detail will be omitted here.

If a YES answer is obtained in step 10 meaning that the travel permission switch 95 is turned off, then the routine proceeds to step 14 wherein the controller 40 regulates the gear ratio of the CVT 22 to set the total gear ratio to a given high-speed gear ratio or alternatively changes the gear ratio of the CVT 22 to have values different between the first and second operation modes. The routine then proceeds to step 16 wherein the controller 40 engages the clutches C1 and C2. If a NO answer is obtained in step 10 or after step 16, the routine terminates.

Other Modifications

The power transmission device in each of the first and second embodiments is, as described above, equipped with the engine starting rotor to be placed in power transmitting communication with the rotating shaft 12a to start the engine 12 and the power transmitted rotor to be placed in power transmitting communication with the rotating shaft 12a to permit the power to be transmitted from the engine 12 which are different from each other, but alternatively be designed to have a modification of the structure of FIG. 1 which includes a one-way power transmission mechanism which permits the power to be transmitted between the engine 12 and the carrier C when the speed of the engine 12 is higher than that of the carrier C and a clutch which selectively blocks the transmission of power between the engine 12 and the carrier C. In this case, the carrier C serves as both the engine starting rotor and the power transmitted rotor.

The power transmission device may be designed to allow the omission of transmission of torque to the driven wheels 14 upon switching between the first and second operation modes. This also offers the same advantage 1), as described in the first embodiment. Specifically, the controller 40 increases the degree of engagement of one of the clutches C1 and C2 gradually which is to be switched from the disengaged state to the engaged state to establish the partial engagement of the one of the clutches C1 and C2. However, when a fail-safe mode is entered in which it is required to switch between the first and second operation modes quickly regardless of mechanical stock arising therefrom, the controller 40 may switch between the first and second operation modes forcibly at a gear ratio of the CVT 22 which develops values of the total gear ratio which are different between the first and second operation modes without creating the partial engagement of the one of the clutches C1 and C2.

The CVT reversing operation needs not necessarily be performed upon switching between the first and second operation modes. For instance, the power transmission device may be so designed that the circulation of power is established in the first operation mode, but not in the second operation mode. The switching from the first operation mode to the second operation mode will improve the power transmission efficiency.

The power transmission device in each of the first and second embodiments connects the motor-generator 10 to the sun gear S mechanically without through the CVT 22, but may be designed to have a modification of the structure of FIG. 8 in which the motor-generator 10 is disposed between the CVT 22 and the clutches C1 and C2.

The clutches C1 and C2 need not necessarily be of a hydraulic controlled type. For instance, the clutches C1 and C2 may be implemented by an electromagnetic clutch, a tooth clutch, or a dog clutch. In this case, the ease of layout of the clutches C1 and C2 is also achieved by connecting the clutches C1 and C2 together through a single common shaft.

The clutches C1 and C2 need not necessarily be joined to the single common shaft, but may be joined independently of each other, This also offers the same advantage 1), as described above.

The power transmission device may alternatively be equipped with a plurality of electric rotating machines for use in running the vehicle. The electric rotating machines may be all or partly implemented by motor-generators. For example, some of the electric rotating machines may be made of electric motors, while the other electric rotating machines may be made of electric generators which also work to charge a high-voltage battery installed in the vehicle to supply electric power to the electric motors. For example, in case of use of an additional electric rotating machine in the structure of FIG. 1, it may be disposed between the ring gear R of the power split device 20 and the gear G5.

The electric rotating machine may alternatively be implemented by a brushed DC motor or an induction motor.

The power transmission device may switch from the second operation mode to the first operation mode when the total gear ration remained unchanged between the first and second operation modes during deceleration of the vehicle. The vehicle may be subjected to the stop control operation, as described above, in the second operation mode.

Total Gear Ratio

Figure 16:
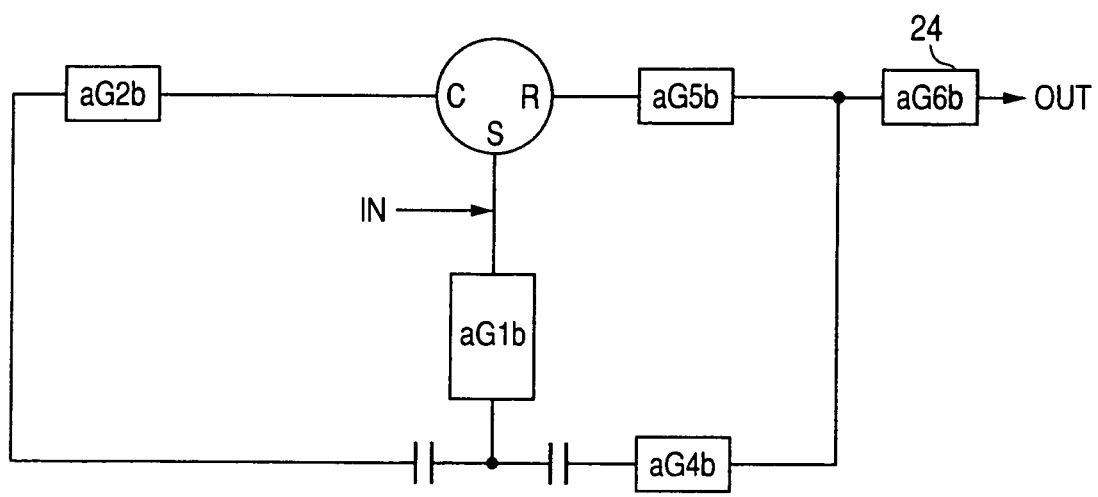
FIG. 16 is a view which shows an equivalent structure of a power transmission device of FIG. 1(a) for explaining how to determine a total gear ratio.

The total gear ratio in the power transmission device of the first embodiment may be determined using an equivalent structure, as illustrated in FIG. 16. The illustrated structure has gears G1, G2, and G4. The gear 1 corresponds to the CVT 22. The gear G2 serves as a combination of the gears G2α and G2β of the first embodiment between the clutch C1 and the carrier C. In the following discussion, a total gear ratio of the gears G2α and G2β is given by a gear ratio r2 of the gear G2. A gear ratio r4 of the gear G4 is one (1).

The gear ratio m of the gear Gn (n=1, 4 to 6) is defined as a ratio of speed b to speed a. Note that each of "a" and "b" in each block of FIG. 16 indicates one of an input and an output of each gear. The number of teeth of the sun gear S/the number of teeth of the ring gear R is defined as a gear ratio ρ. The rotational speeds of the sun gear S, the ring gear R, and the carrier C are defined as ωS, ωR, and ωC, respectively. Equation (c5) is met.

$$\rho\omega S-(1+\rho)\omega C+\omega R=0 \quad (c5)$$

1 Total Gear Ratio in First Operation Mode

In the first operation mode, the speed ωS of the sun gear S and the speed ωC of the carrier C have the following relation, $$\omega C=r1 \cdot r2 \cdot \omega S \quad (c6)$$

The speed ωG6b of an output of the gear G6 is given by Eq. (7) below.

$$\omega G6b=r6 \cdot r5 \cdot \omega R \quad (c7)$$

By substituting Eqs. (c6) and (c7) into Eq. (c5), we obtain $$\omega G6b=r6 \cdot r5 \cdot \{r1 \cdot r2(1+\rho)-\rho\}\omega S \quad (c8)$$

Therefore, the total gear ratio is given by Eq. (c9) below.

$$\text{Total gear ratio}=r6 \cdot r5\{r1 \cdot r2(1+\rho)-\rho\} \quad (c9)$$

2 Total Gear Ratio in Second Operation Mode

The total gear ratio in the second operation mode is given by Eq. (c10) below in a power transmission path extending through the gears G1, G4, and G6.

$$\text{Total gear ratio} = r1 \cdot r4 \cdot r6 \quad \text{(c10)}$$

3 Mode Switching Condition without Omission of Transmission of Torque

No omission of transmission of torque is achieved under condition where the speed ωG1b of the gear G1 is equal to both the speed ωG2α of the gear G2 and the speed ωG4α of the gear G4. This condition is expressed by $$\omega C/r2 = \omega S \cdot r1 = \omega R \cdot r5/r4 \quad \text{(c11)}$$

Expressing the speeds ωS and ωR of the sun gear S and the ring gear R by the speed ωC of the carrier C in Eq. (c11), and substituting it into Eq. (c5), we obtain $$r1 = \rho r5/\{r2r5 \cdot (1+\rho) - r4\} \quad \text{(c12)}$$

The switching between the first and second operation modes with no omission of transmission of torque to the driven wheels 14 is, therefore, achieved by selecting the gear ratio r1 of the CVT 22 (i.e., the gear G1 in FIG. 16) to have the value in the right side of Eq. (c12).

CVT Reversing Operation

The CVT reversing operation is achieved under condition that the product of values derived by differentiating a function in which the total gear ratio is expressed by a dependent variable, and the gear ratio r1 is expressed by an independent variable with respect to the gear ratio r1 in the first operation mode and in the second operation mode is negative.

Using Eqs. (c9) and (c10), the above condition is given by $$\{r6 \cdot r5 \cdot r2 \cdot (1+\rho)\} \cdot \{r4 \cdot r6\} < 0$$

Rewriting the above relation, we obtain $$r5 \cdot r4 \cdot r2 < 0 \quad \text{(c13)}$$

Since, in the structure of the first embodiment, the gear G5, G2α, and G2β are counter gears, and the gear G4 is omitted, r2>0, r5<0, and r4=1.

The total gear ratio in the structure of FIG. 8 may also be determined in the same manner as described above.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A power transmission apparatus for a vehicle comprising:
a power split device which includes a first, a second, and a third rotor which are configured to rotate in conjunction with each other to split power among an electric rotating machine, an internal combustion engine, and a driven wheel of the vehicle,
the first, the second, and the third rotor being so linked and configured as to have rotational speeds that are arrayed on a straight line when graphically displayed in a nomographic chart;
a torque transmission control mechanism configured to selectively establish and block transmission of torque between the first rotor and the internal combustion engine;
a connecting mechanism configured to establish a mechanical connection between the second rotor and the third rotor; and
a speed variator configured to have a variable input-to-output speed ratio,
the power transmission apparatus being configured such that when the second and third rotors are mechanically connected by the connecting mechanism, the electric rotating machine and the driven wheel are both mechanically connected to the second rotor and the third rotor, and
wherein when the connecting mechanism establishes the mechanical connection between the second rotor and the third rotor, and when the torque transmission control mechanism establishes the transmission of torque between the first rotor and the internal combustion engine, powers of the second and third rotors are opposite in sign to each other,
the power transmission apparatus further comprising a torque applying mechanism configured to establish a mechanical connection between the second rotor and the internal combustion engine to apply torque, as produced by the internal combustion engine, to the second rotor, wherein the torque applying mechanism is configured to serve as a one-way torque transmission mechanism which has an input leading to the internal combustion engine and an output leading to the second rotor and works to transmit the torque from the input to the output when a speed of the input is higher than a speed of the output.

2. The power transmission apparatus according to claim 1, wherein torque produced by the first rotor, torque produced by the second rotor, and torque produced by the third rotor proportionally vary with each other.

3. The power transmission apparatus according to claim 1, wherein the electric rotating machine is configured to be connected mechanically to the second rotor without the speed variator in the mechanical connection path between the electric rotating machine and the second rotor, and wherein the driven wheel is coupled mechanically to the third rotor without the speed variator in the mechanical connection path between the driven wheel and the third rotor.

4. The power transmission apparatus according to claim 1, wherein the torque applying mechanism is configured to connect the internal combustion engine to the second rotor without the speed variator in the mechanical connection path between the internal combustion engine and the second rotor.

5. The power transmission apparatus according to claim 1, wherein the first, second, and third rotors of the power split device are all part of a single planetary gear set consisting of a sun gear, a carrier, and a ring gear, and wherein one of the first, second, and third rotors is the sun gear, one of the first, second, and third rotors is the carrier, and one of the first, second, and third rotors is the ring gear.

6. A power transmission apparatus for a vehicle comprising:
a power split device which includes a first, a second, and a third rotor which are configured to rotate in conjunction with each other to split power among an electric rotating machine, an internal combustion engine, and a driven wheel of the vehicle,
the first, the second, and the third rotor being so linked and configured as to have rotational speeds that are arrayed on a straight line when graphically displayed in a nomographic chart;

a torque transmission control mechanism configured to selectively establish and block transmission of torque between the first rotor and the internal combustion engine;

a connecting mechanism configured to establish a mechanical connection between the second rotor and the third rotor; and a speed variator configured to have a variable input-to-output speed ratio, the power transmission apparatus being configured such that when the second and third rotors are mechanically connected by the connecting mechanism, the electric rotating machine and the driven wheel are both mechanically connected to the second rotor and the third rotor, and wherein when the connecting mechanism establishes the mechanical connection between the second rotor and the third rotor, and when the torque transmission control mechanism establishes the transmission of torque between the first rotor and the internal combustion engine, powers of the second and third rotors are opposite in sign to each other, the power transmission apparatus further comprising a second connecting mechanism which is configured to establish a mechanical connection between the first and second rotors through a second power transmission path, and wherein (i) a first connecting mechanism that is said connecting mechanism to connect the second and third rotors mechanically through a first power transmission path, wherein said speed variator is disposed in the first power transmission path, and (ii) the second connecting mechanism are configured to be controlled in operation to switch between a first operation mode and a second operation mode, the first operation mode being to establish the mechanical connection between the second and third rotors through the first connecting mechanism and block the mechanical connection between the first and second rotors through the second connecting mechanism, the second operation mode being to block the mechanical connection between the second and third rotors through the first connecting mechanism and establish the mechanical connection between the first and second rotors through the second connecting mechanism, wherein a total power transmission path is provided between one of the internal combustion engine and the electric rotating machine and the driven wheel, the power transmission apparatus being configured such that (i) there is a function in which
 (a) the input-to-output speed ratio of the speed variator is expressed by an independent variable and
 (b) a total input-to-output speed ratio of the total power transmission path is expressed by a dependent variable,
(ii) a first order derivative value of the function with respect to the independent variable in the first operation mode is opposite in sign to the first order derivative value of the independent variable in the second operation mode.

7. The power transmission apparatus according to claim 6 being further configured (i) such that, in the first operation mode, when a sign of speed of the electric rotating machine is represented by either a plus or minus sign, the signs of powers, as produced by the first and second rotors, are opposite to each other, and (ii) such that, in the second operation mode, when the torque transmission control mechanism is configured to block the transmission of torque between the first rotor and the internal combustion engine, signs of powers, as produced by the second and third rotors, are the same as each other.

8. The power transmission apparatus according to claim 6, wherein the speed variator is configured to change the speed of at least one of the second and third rotors such that the change of speed compensates for a difference in speed between the second and third rotors when the first operation mode is switched to the second operation mode to establish the mechanical connection between the second and third rotors by the first connecting mechanism.

9. The power transmission apparatus according to claim 6, wherein the speed variator is configured to change the speed of at least one of the first and second rotors, such that the speed variator is configured to compensate for a difference in speed between the first and second rotors when the first connecting mechanism and the second connecting mechanism are controlled to switch the second operation mode to the first operation mode.

10. A power transmission apparatus for a vehicle comprising:

a power split device which includes a first, a second, and a third rotor which are configured to rotate in conjunction with each other to split power among an electric rotating machine, an internal combustion engine, and a driven wheel of the vehicle, the first, the second, and the third rotor being so linked and configured as to have rotational speeds that are arrayed on a straight line when graphically displayed in a nomographic chart;

a torque transmission control mechanism configured to selectively establish and block transmission of torque between the first rotor and the internal combustion engine;

a connecting mechanism configured to establish a mechanical connection between the second rotor and the third rotor; and a speed variator configured to have a variable input-to-output speed ratio, the power transmission apparatus being configured such that when the second and third rotors are mechanically connected by the connecting mechanism, the electric rotating machine and the driven wheel are both mechanically connected to the second rotor and the third rotor, and wherein when the connecting mechanism establishes the mechanical connection between the second rotor and the third rotor, and when the torque transmission control mechanism establishes the transmission of torque between the first rotor and the internal combustion engine, powers of the second and third rotors are opposite in sign to each other, wherein the torque transmission control mechanism includes an electronically-controlled breaker which is configured to block the transmission of torque between the first rotor and the internal combustion engine, wherein the torque transmission control mechanism also includes a one-way power transmission mechanism which is configured to establish the transmission of torque between the first rotor and the internal combustion engine under a condition that a speed of an input of the one-way power transmission mechanism leading to the first rotor is higher than a speed of an output of the one-way power transmission mechanism leading to the internal combustion engine.

* * * * *